US012793500B2

(12) United States Patent
Jones et al.

(10) Patent No.: US 12,793,500 B2
(45) Date of Patent: Nov. 10, 2026

(54) CONTROLLING ROULETTE PROGRESSIVE BONUS FEATURES

(71) Applicant: LNW Gaming, Inc., Las Vegas, NV (US)

(72) Inventors: William Jones, Boulder, CO (US); Daniel Ambrose, Las Vegas, NV (US)

(73) Assignee: LNW Gaming, Inc., Las Vegas, NV (US)

( * ) Notice: Subject to any disclaimer, the term of this patent is extended or adjusted under 35 U.S.C. 154(b) by 201 days.

(21) Appl. No.: 18/483,840

(22) Filed: Oct. 10, 2023

(65) Prior Publication Data

US 2024/0304055 A1 Sep. 12, 2024

Related U.S. Application Data

(60) Provisional application No. 63/489,200, filed on Mar. 9, 2023.

(51) Int. Cl.
*G07F 17/32* (2006.01)

(52) U.S. Cl.
CPC ...... *G07F 17/3213* (2013.01); *G07F 17/3258* (2013.01); *G07F 17/3288* (2013.01)

(58) Field of Classification Search
CPC ............. G07F 17/3213; G07F 17/3258; G07F 17/3288
USPC ............................................................ 463/17
See application file for complete search history.

(56) References Cited

U.S. PATENT DOCUMENTS

| | | | |
|---|---|---|---|
| 4,869,505 | A | 9/1989 | Manabe |
| 5,540,442 | A | 7/1996 | Orselli et al. |
| 5,902,184 | A | 5/1999 | Bennett |
| 7,727,061 | B2 | 6/2010 | Taylor |
| 8,002,629 | B2 | 8/2011 | Bennet et al. |
| 8,272,958 | B2 | 9/2012 | Good et al. |
| 8,337,289 | B2 | 12/2012 | Bartosik |
| 9,120,007 | B2 | 9/2015 | Costello et al. |
| 9,230,394 | B2 | 1/2016 | Jarvis et al. |

(Continued)

FOREIGN PATENT DOCUMENTS

WO WO2000033269 6/2000

OTHER PUBLICATIONS

"G4 Organic Catalogue," Elektroncek d.d, (Oct. 2010).

(Continued)

*Primary Examiner* — Ryan Hsu

(57) ABSTRACT

A method and/or system to perform operations associated with a roulette game. The operations include triggering a progressive jackpot bonus game in response to determination that a player terminal placed a bet on a randomly selected wheel-segment value from a roulette wheel. The bonus game comprises a plurality of rounds. For each round, the operations include animating, via an electronic display, a first highlight effect that indicates a range of eligible pockets on the roulette wheel associated with the randomly selected wheel-segment value. The size of the range of eligible pockets for each round corresponds respectively to one of a plurality of progressive jackpot levels associated with each round. The operations further include animating a spin of the roulette wheel, and animating, based on a result of the spin, a second highlight effect to indicate whether the result of the spin lands within the range of eligible pockets.

20 Claims, 16 Drawing Sheets

(56) References Cited

U.S. PATENT DOCUMENTS

| | | | | |
|---|---|---|---|---|
| 9,600,974 | B2 | 3/2017 | Yee et al. | |
| 9,935,824 | B2 | 4/2018 | Cors et al. | |
| 10,629,024 | B1 | 4/2020 | Haushalter | |
| 11,011,014 | B1 | 5/2021 | Haushalter | |
| 2003/0023735 | A1 | 1/2003 | Funahashi et al. | |
| 2003/0050111 | A1 | 3/2003 | Saffari | |
| 2003/0071417 | A1 | 4/2003 | Webb | |
| 2006/0052160 | A1 | 3/2006 | Saffari et al. | |
| 2006/0100019 | A1 | 5/2006 | Hornik et al. | |
| 2008/0146346 | A1 | 6/2008 | Hardy et al. | |
| 2008/0242393 | A1* | 10/2008 | Kido | G07F 17/3258 463/43 |
| 2008/0242421 | A1 | 10/2008 | Geisner et al. | |
| 2008/0248853 | A1 | 10/2008 | Kido | |
| 2009/0108526 | A1 | 4/2009 | Moody | |
| 2009/0283967 | A1 | 11/2009 | Stergides | |
| 2010/0029381 | A1* | 2/2010 | Vancura | G07F 17/3267 463/30 |
| 2010/0331070 | A1 | 12/2010 | Bartosik | |
| 2011/0180991 | A1 | 7/2011 | Hsu | |
| 2012/0153571 | A1 | 6/2012 | Smith et al. | |
| 2012/0302307 | A1 | 11/2012 | Abrahamson | |
| 2013/0184059 | A1 | 7/2013 | Costello et al. | |
| 2014/0235310 | A1 | 8/2014 | Casey | |
| 2016/0019744 | A1 | 1/2016 | Pagano et al. | |
| 2020/0120273 | A1 | 4/2020 | Kazuyuki | |
| 2021/0233346 | A1 | 7/2021 | Ludwick | |
| 2021/0241577 | A1* | 8/2021 | Burgstaller | G07F 17/329 |
| 2023/0096360 | A1 | 3/2023 | Atkinson | |
| 2023/0114268 | A1 | 4/2023 | Jones | |

OTHER PUBLICATIONS

YouTube: "Lightning Roulette! High stakes big win 500X—Croupier Casino Gambling," uploaded Oct. 12, 2018, available at https://www.youtube.com/watch?v=uW6bsHAdv80.

* cited by examiner

CONTROLLING ROULETTE PROGRESSIVE BONUS FEATURES

RELATED APPLICATIONS

This patent application claims priority benefit to U.S. Provisional Patent Application No. 63/489,200 filed Mar. 9, 2023. The 63/489,200 Application is hereby incorporated by reference herein in its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2023, LNW Gaming, Inc.

FIELD

The present disclosure relates generally to gaming systems, apparatus, and methods and, more particularly, to presentation and control of roulette games.

BACKGROUND

The gaming industry depends upon player participation. Players are generally "hopeful" players who either think they are lucky or at least think they can get lucky—for a relatively small investment to play a game, they can get a disproportionately large return. To create this feeling of luck, a gaming apparatus relies upon an internal or external random element generator to generate one or more random elements such as random numbers. The gaming apparatus determines a game outcome based, at least in part, on the one or more random elements.

Roulette is a well-known casino game which has been played for many years. A typical conventional roulette game includes a table bearing a felt covering upon which indicia forming a betting layout has been silk-screened or otherwise imprinted. A typical roulette wheel includes a number ring bearing a circular array of numbered segments bearing number values (or number indicia) "1" through "36." The numbered segments may also be referred to as "pockets" as they each include a recessed portion, or "pocket," into which a roulette ball can come to rest as a spin outcome for the game. The betting layout has individual betting spots that correspond to (and indicate) the number values. In addition to the number values "1" through "36," the number ring (and corresponding betting layout) typically includes one or more additional number values (or number indicia) such as "0," "00," some combination thereof, etc. For example, a first version of roulette (called the "European" version) includes only the single "0" value on the roulette wheel and the betting layout whereas another version (called the "American" version) includes both the "0" and the "00" on the roulette wheel and the betting layout. Typically, for the American version, the "0" and the "00" are disposed at diametrically opposite locations on the number ring of the roulette wheel. The numbers values "1" through "36" are not disposed in numerical order, but are typically disposed in a predetermined arrangement based on the version of roulette being played. For example, the predetermined arrangement of the number values on the roulette wheel vary in their placement between the American version and the European version. The betting layouts may also appear different for the different versions of the game.

Furthermore, both the roulette wheel segments and/or betting spots on the betting layout that correspond to the number values typically bear the alternating colors of red and black, with the exception of the "0" and "00" number values, whose wheel segments and/or betting spots are typically colored green. A ring of pockets corresponding in number to the plurality of numbers of the circular number ring lies adjacent, but radially inward of the number ring, on the typical roulette wheel. In addition, a typical roulette wheel includes a circular, inclined ball track, disposed above, and radially outwardly of the number ring.

In operation of a typical roulette game, players place chips or tokens on the betting layout located on the roulette table, and then the dealer (referred to as a "croupier" in roulette) spins the roulette wheel to place the ball in motion about the circular ball track. As the roulette wheel slows, the ball moves radially inwardly and comes to rest in one of the pockets associated with a particular one of the numbers of the number ring. After the ball comes to rest in one of the pockets, the croupier or dealer settles the various wagers placed on the table layout in accordance with predetermined rules and wager odds.

A significant technical challenge with some games, including roulette, is to provide a new and improved level of game play that uses new or improved gaming apparatus animations. Animations represent improvements to the underlying technology or technical field of gaming apparatus and, at the same time, have the effect of encouraging prolonged and frequent player participation.

SUMMARY

According to one embodiment of the present disclosure, a method and/or system is described herein to perform operations associated with a roulette game. In one embodiment, the operations include triggering a progressive jackpot bonus game in response to determination that a player terminal, of an electronic roulette game system, placed a bet on a randomly selected wheel-segment value from a roulette wheel of a roulette game. The bonus game comprises a plurality of rounds. For each round of the plurality of rounds, the operations include animating, via an electronic display associated with the player terminal, a first highlight effect that indicates a range of eligible pockets on the roulette wheel associated with the randomly selected wheel-segment value. The size of the range of eligible pockets for each round corresponds respectively to one of a plurality of progressive jackpot levels associated with each round. The operations further include animating, after animating the first highlight effect, a spin of the roulette wheel, and animating, by the processor in response to determining a result of the spin, a second highlight effect to indicate whether the result of the spin lands within the range of eligible pockets According to one embodiment of the present disclosure, a method and/or electronic roulette game system comprising at least one player terminal, an electronic display associated with the at least one player terminal; and one or more electronic processors configured to execute instructions, which when executed cause the electronic roulette game system to perform operations to accept, during a betting period of a roulette game, one or more bets from the at least one player terminal, wherein the one or more bets are placed on one or more user-selected betting layout values of a betting layout presented via the electronic display. The operations are further to randomly select, via a random number generator after the betting period ends, a wheel-segment value associated with a roulette wheel for the electronic roulette game system and determine that at least one of the one or more user-selected betting layout values corresponds to the randomly selected wheel-segment value. The operations are further to trigger, in response to determination that the at least one of the one or more user-selected betting layout values corresponds to the randomly selected wheel-segment value, a progressive jackpot bonus game for the at least one player terminal. The operations are further to animate, via the electronic display during an initial round of the bonus game, a first highlight effect that indicates a first range of eligible pockets on the roulette wheel associated with the randomly selected wheel-segment value; animate, during the bonus game after animation of the first highlight effect, a spin of the roulette wheel; determine that a result of the spin lands within the first range of eligible pockets; initiate, based on the result of the spin landing within the first range of eligible pockets, a subsequent round of the bonus game; and animate, via the electronic display during the subsequent round, a second highlight effect that indicates a second range of eligible pockets on the roulette wheel associated with the randomly selected wheel-segment value, wherein a size of the second range of eligible pockets is smaller than the size of the first range of eligible pockets.

Additional aspects of the invention will be apparent to those of ordinary skill in the art in view of the detailed description of various embodiments, which is made with reference to the drawings, a brief description of which is provided below.

Figure 1:
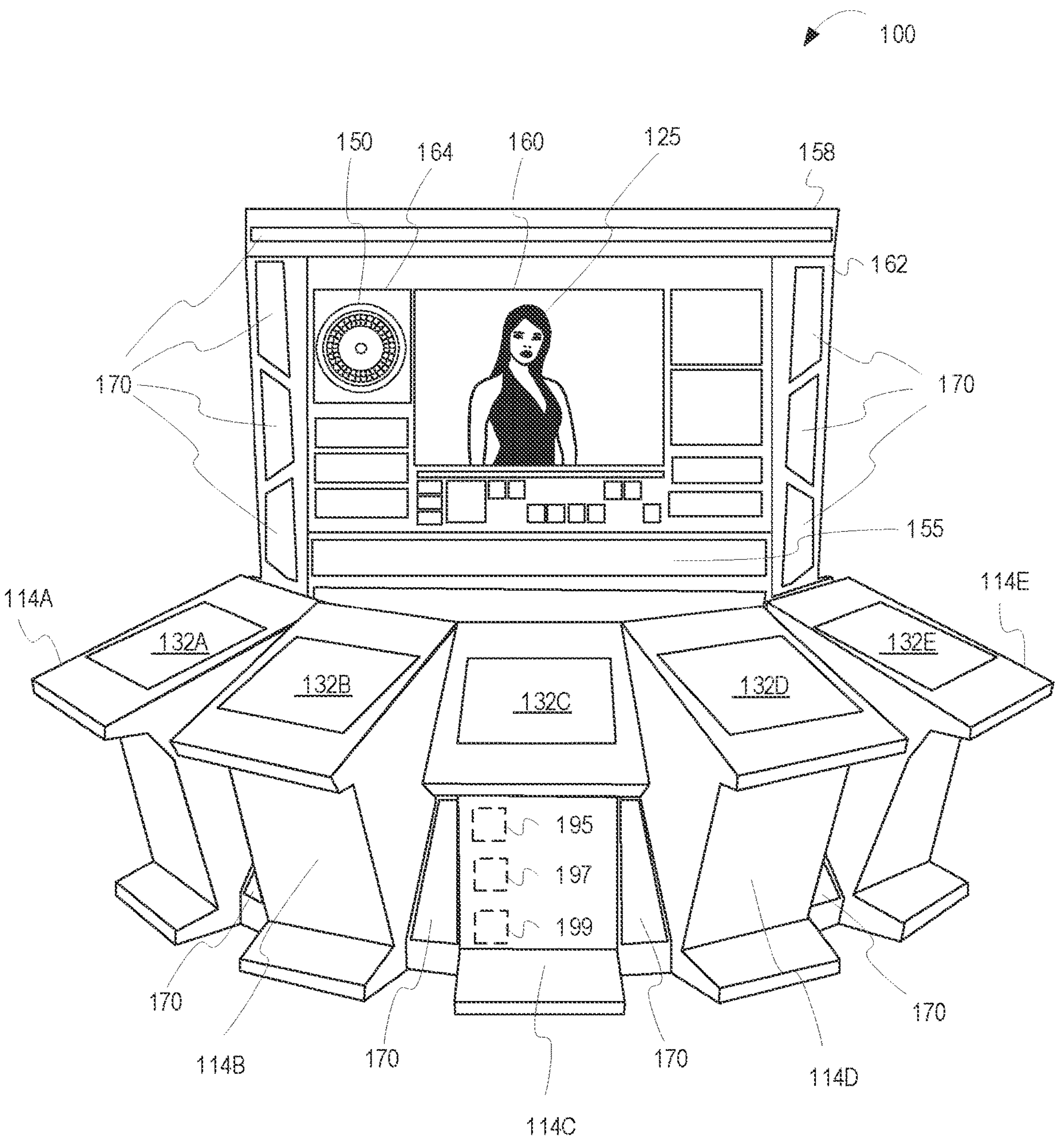
FIG. 1 is a perspective view of a gaming system 100 configured for implementation with a virtual croupier according to at least some aspects of the disclosed concepts.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

For purposes of the present detailed description, the terms "wagering game," "casino wagering game," "gambling," "slot game," "casino game," and the like include games in which a player places at risk a sum of money or other representation of value, whether or not redeemable for cash, on an event with an uncertain outcome, including without limitation those having some element of skill. In some embodiments, the wagering game involves wagers of real money, as found with typical land-based or online casino games. In other embodiments, the wagering game additionally, or alternatively, involves wagers of non-cash values, such as virtual currency, and therefore may be considered a social or casual game, such as would be typically available on a social networking web site, other web sites, across computer networks, or applications on mobile devices (e.g., phones, tablets, etc.). When provided in a social or casual game format, the wagering game may closely resemble a traditional casino game, or it may take another form that more closely resembles other types of social/casual games.

FIG. 1 is a perspective view of a gaming system 100 configured for implementation with a virtual croupier 125 according to at least some aspects of the disclosed concepts. One example of the gaming system 100 is described in U.S. patent application Ser. No. 17/948,755, filed Sep. 20, 2022 (i.e., the "Ser. No. 17/948,755 application"), and in U.S. patent application Ser. No. 17/948,633, filed Sep. 20, 2022 (i.e., the "Ser. No. 17/948,633 application"), which Ser. No. 17/948,755 application and Ser. No. 17/948,633 application are each incorporated by reference herein in their respective entireties. All patent applications, patents, and printed publications cited herein are incorporated herein by reference in the entireties, except to the extent that the incorporated material is inconsistent with the express disclosure herein, in which case the language in this disclosure controls.

The gaming system 100 includes player terminals 114A through 114E that are arranged in a bank around a video device 158. The video device 158 includes a roulette wheel screen 164 and a virtual croupier screen 160. In some embodiments, the virtual croupier screen 160 displays a video simulation of a croupier (e.g., virtual croupier 125) for interaction with the video device 158, such as through processing one or more stored programs stored in a memory 195 to implement the rules of game play at the video device 158. The virtual croupier screen 160 may be carried by a generally vertically extending cabinet 162 of the video device 158. The roulette wheel screen 164 may be configured to display at least a virtual roulette wheel 150 that responds to operations for the virtual croupier 125.

Each of the player terminals 114A through 114E includes a respective player interface area 132A through 132E that is configured for wagering and game play interactions with the video device 158 and/or virtual croupier 125. The player interface area 132A through 132E can present (depending on a display mode) either one of a user interface (e.g., see user interface 412 in FIG. 4) or a display (e.g., see display 403 in FIG. 4). Furthermore, in some embodiments, all or more of the portion (and/or content) of the display can be presented via the video device 158. Accordingly, game play may be accommodated without involving a physical roulette wheel, physical chips, and/or live personnel. The action may instead be simulated by a control processor 197 interacting with and controlling the video device 158. The control processor 197 may be located internally within, or otherwise proximate to, the video device 158, such as in one of the player terminals 114A through 114E. The control processor 197 may be programmed to implement the rules of game play at the video device 158. As such, in some embodiments, the control processor 197 interacts and communicates with display/input interfaces and data entry inputs for each player interface area 132A through 132E of the respective player terminals 114A through 114E. Other embodiments of gaming systems and gaming devices may include a control processor that may be similarly adapted to the specific configuration of its associated device. In some examples herein, the control processor 197 is referred to as a game controller (e.g., game controller 210). Furthermore, in some examples, the player terminals 114A through 114E can vary in number or location. For example, any of the player terminals 114A through 114E may be any one of the player terminals 202 described in FIG. 2, or any of the player terminals 541, 542, or 543 described in FIG. 4 and FIG. 5.

Still referring to FIG. 1, a communication device 199 may be included and operably coupled to the control processor 197 such that information related to operation of the gaming system 100, information related to the game play, or combinations thereof may be communicated between the gaming system 100 and other devices (not shown) through a suitable communication media, such, as, for example, wired networks, Wi-Fi networks, and cellular communication networks. In some embodiments, the communication device 199 is, or is associated with, switch 220 of FIG. 2, network 1330 of FIG. 6, or network adapter 1456 of FIG. 7.

Referring still to FIG. 1, the video device 158 may further include one or more banners 155 configured to communicate rules of play and/or the like, which may be located along one or more walls of the cabinet 162 or otherwise incorporated into the video device 158. The video device 158 may further include additional decorative lights (e.g., emotive lighting 170) and speakers (not shown). In some embodiments, the processor animates highlight effects with the decorative lights. For instance, the processor can select a color for the decorative lights that matches (e.g., an attribute or characteristic of) a highlight effect.

Further detail of an example of a table and/or gaming system and player displays is disclosed in U.S. patent application Ser. No. 10/764,995, filed Jan. 26, 2004, published as United States Patent Application Publication No. 2005/0164762 on Jul. 28, 2005, now U.S. Pat. No. 8,272,958, issued Sep. 25, 2012, and titled "AUTOMATED MULTIPLAYER GAME TABLE WITH UNIQUE IMAGE FEED OF DEALER," the disclosure of each of which application and patent is incorporated herein in its entirety by this reference. Although an embodiment is described showing individual discrete player terminals, in some embodiments, the entire playing surface (e.g., player interface areas 132A through 132E, roulette wheel screen 164, etc.) may be an electronic display that is logically partitioned to permit game play from a plurality of players for receiving inputs from, and displaying game information to, the players, the dealer, or both.

Figure 2:
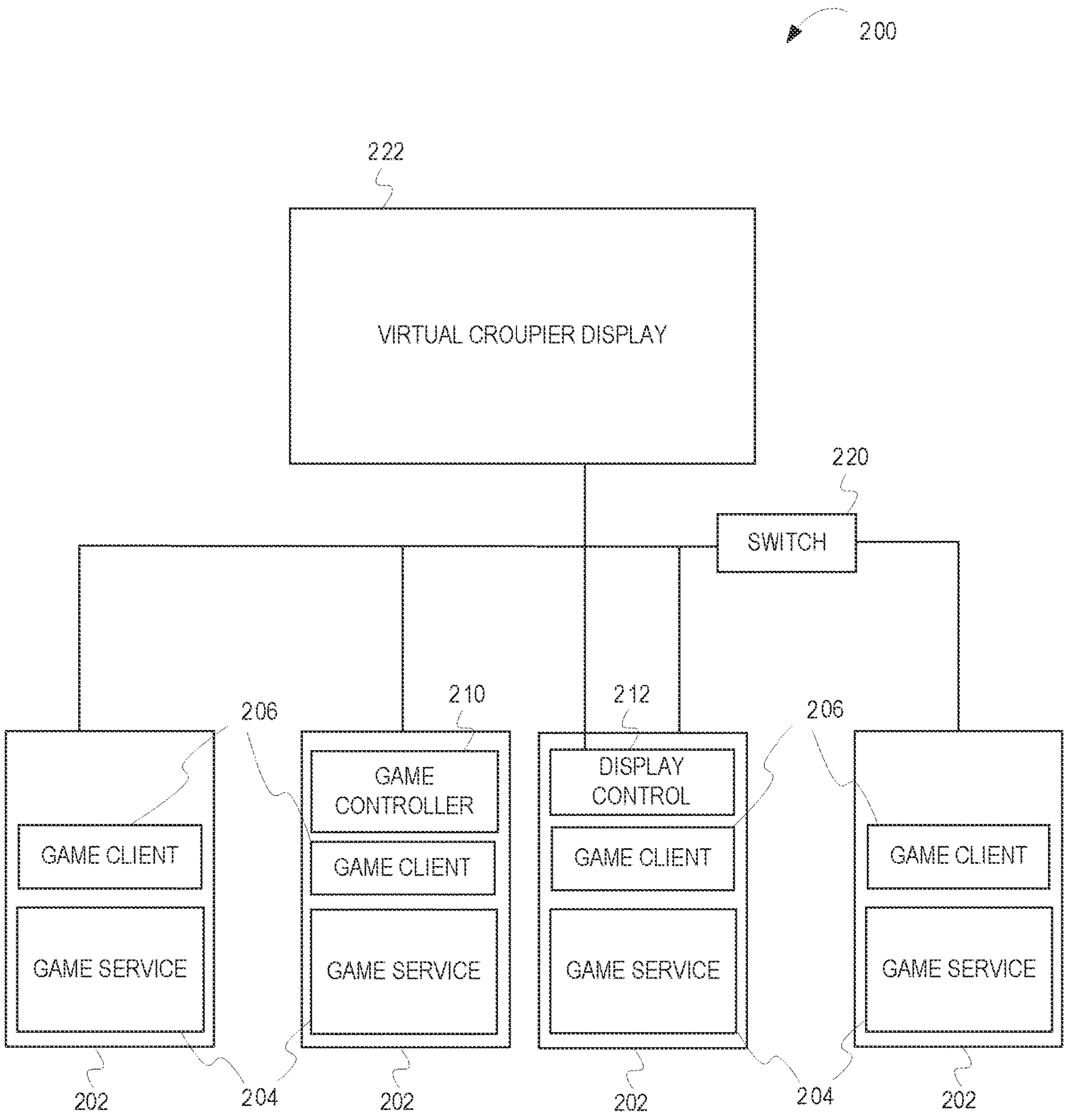
FIG. 2 is a schematic block diagram of a gaming system architecture 200 according to at least some aspects of the disclosed concepts.

FIG. 2 is a schematic block diagram of a gaming system architecture ("architecture 200") according to at least some aspects of the disclosed concepts. The architecture 200 includes a plurality of player terminals 202 communicatively coupled via a network communication device (e.g., switch 220) to a virtual croupier display 222. The virtual croupier display 222 presents instructions from a virtual croupier for a group roulette game (e.g., as presented by video device 158 in FIG. 1). The virtual croupier display 222 is controlled by a display control 212 associated with one of the player terminals 202. The display control 212 is configured to present a roulette wheel (e.g., the display control 212 animates the roulette wheel 150 (see FIG. 1) or roulette wheel 550 (see FIG. 5)) via the virtual croupier display 222. Furthermore a game engine (also referred to as game controller 210), is associated with a different one of the player terminals 202. The game controller 210 executes roulette-outcome logic, resets won progressive values, and contains a random number generator (RNG) to (a) determine a final resting position for a roulette ball, (b) randomly select and provide multiplier levels to active player terminals, (c) randomly select and provide layout values for some multiplier levels, (d) randomly select and provide unique layout values for progressive-related multiplier levels, (e) etc.

Each of the player terminals 202 includes a game client 206 that subscribes to a game service 204 associated with the roulette game. Each of the game clients 206 is configured to present game content (e.g., game assets for betting layouts, roulette wheels, highlight effects, etc.). In some embodiments, the game clients 206 are configured to present the game content and highlight effects via player interface areas 132A through 132E (shown in FIG. 1). In some embodiments, the game clients 206 are configured to present the game content via user interfaces (e.g., see user interface 412 in FIG. 4). Furthermore, in some embodiments, the game service 204 is associated with the game controller 210 and/or a game server (e.g., game server 1306 described for FIG. 6).

Figure 3:
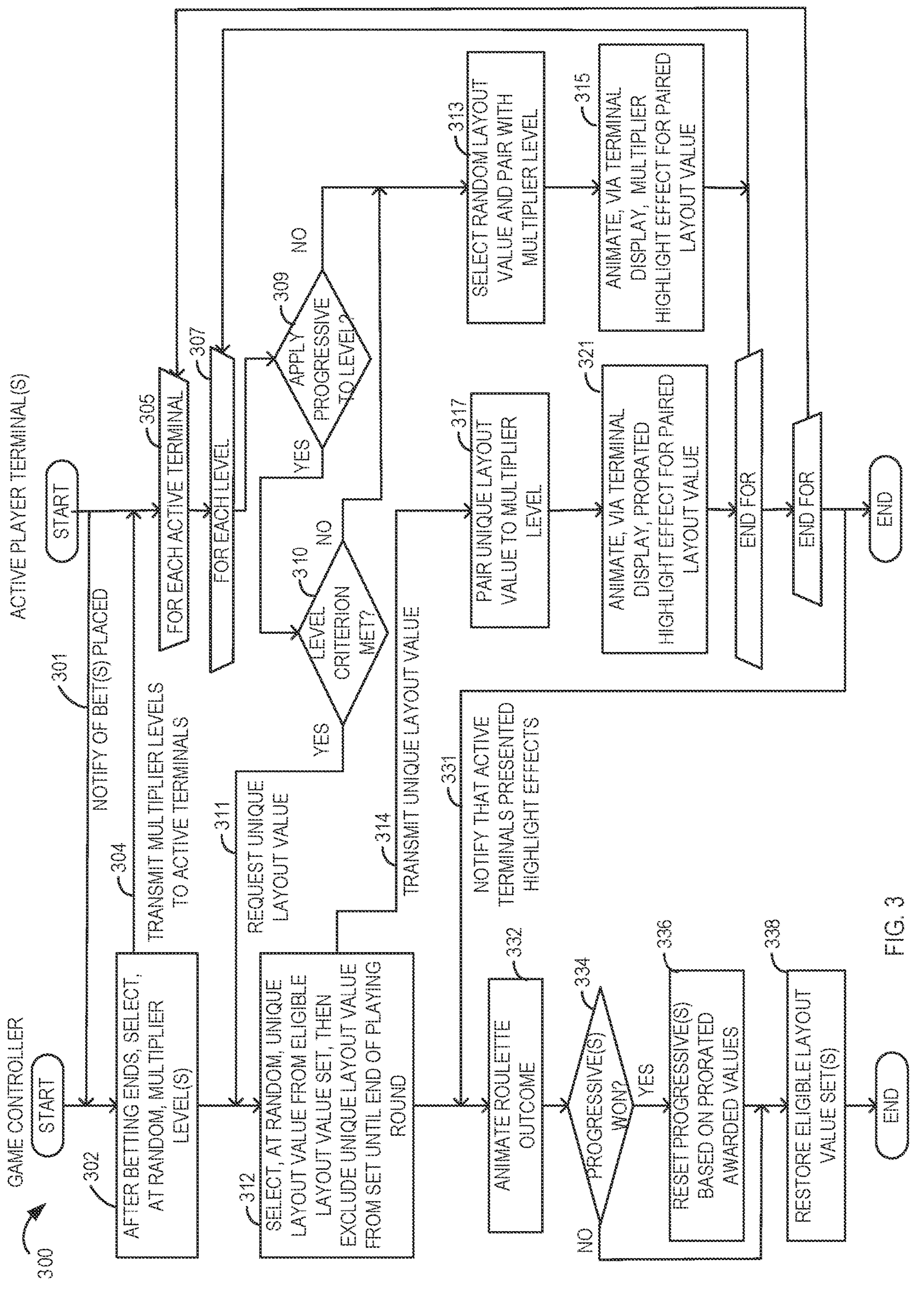
FIG. 3 is a flowchart for controlling roulette highlight features according to at least some aspects of the disclosed concepts.
Figure 4:
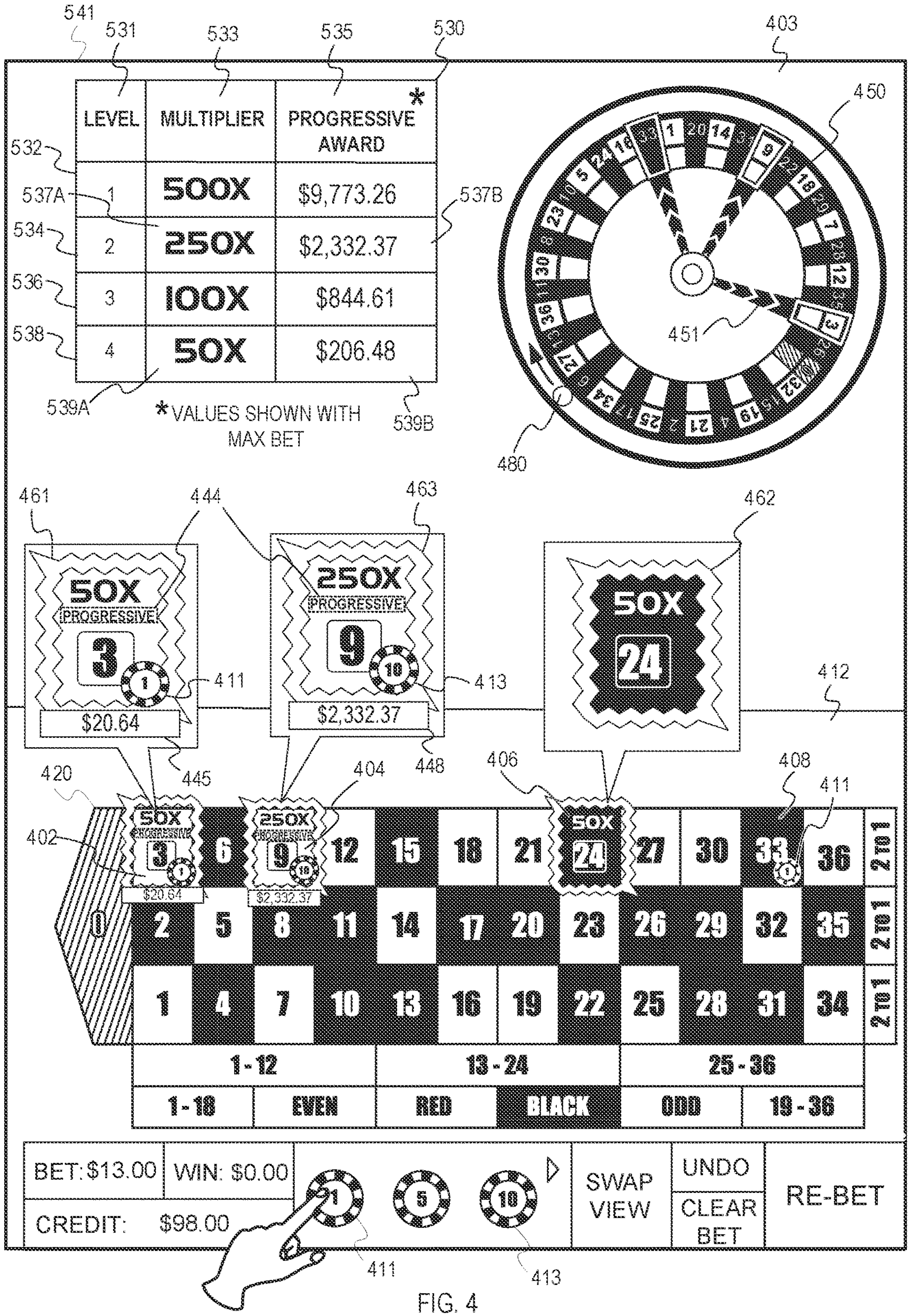
FIG. 4 is a diagram of controlling one or more progressive jackpot highlight features according to at least some aspects of the disclosed concepts.
Figure 5:
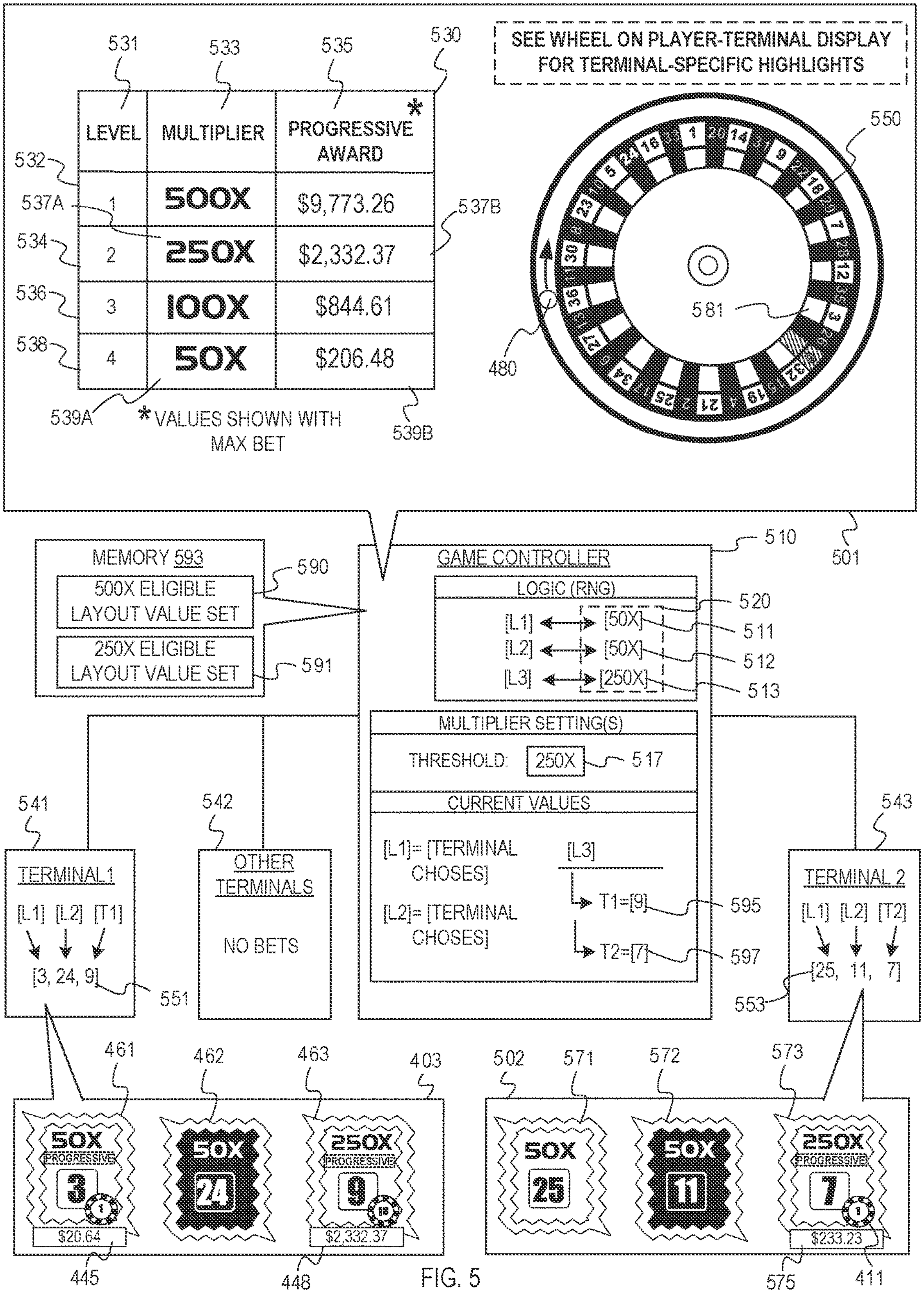
FIG. 5 is a diagram of controlling one or more progressive jackpot highlight features according to at least some aspects of the disclosed concepts.

FIG. 3 is a flowchart of a flow (300) for controlling roulette highlight features according to at least some aspects of the disclosed concepts. FIG. 4 and FIG. 5 are diagrams of controlling progressive jackpot highlight features according to at least some aspects of the disclosed concepts. FIG. 4 and FIG. 5 will be referred to concurrently with the description of the flow 300. It should be noted that while some embodiments disclosed mention one or more devices that perform an action, the processor that performs the action may one of one or more processors that are available by a gaming system and/or distributed across a gaming network.

Referring to FIG. 3, the flow 300 starts at processing block 301, where active player terminals detect and notify the game controller of placement of a plurality of roulette bets made via betting layouts presented on the active player terminals of a gaming system. In some examples, the gaming system may also be referred to as an electronic roulette system. The betting layouts are presented at each player terminal, and each betting layout has equivalent betting layout values. In FIG. 4, one example of a betting layout 420 is illustrated. The betting layout 420 is presented via a first player terminal (e.g., first player terminal 541 shown in FIG. 4 and FIG. 5). The betting layout 420 is also presented via a second player terminal (e.g., via second player terminal 543 in FIG. 5). However, for purposes of brevity, this description shows only the betting layout 420 as presented via the first player terminal 541 (e.g., as shown in FIG. 4). It is to be understood that the same functionality is available via the betting layout 420 presented by the second player terminal 543, or any other of the player terminals. Referring still to FIG. 4, the first player terminal 541 includes the user interface 412 and the display 403. On the user interface 412 are controls, settings, objects, etc. that a player interacts with during a game of roulette. The user interface 412 includes the betting layout 420 for placement of one or more bets. In one example, the user interface 412 includes a plurality of different virtual tokens of differing denomination values (e.g., a token 411 worth $1, a token 413 worth $10, etc.). While only some denomination values are shown, other denomination values may be included (e.g., 15, 20, 25, 50, 100, etc.). In some embodiments, the other virtual tokens may be accessible via a user-interface object (e.g., via scroll control). In other embodiments, the ranges of denomination values may be automatically set based on other game factors, such as for a betting level or tier associated with multiplier ranges. A more detailed description of how betting levels or tiers are associated with multiplier ranges can be found in the Ser. No. 17/948,755 application and/or the Ser. No. 17/948,633 application referenced previously.

A player can drag one or more of the virtual tokens onto one or more positions (betting spots) on the betting layout 420 associated with one or more types of bets. When the player releases the drag-and-drop feature (e.g., when the player lifts their finger off of the user interface 420), the bet is placed. Once the croupier calls an end to betting, because the virtual token is in a betting spot, the bet is accepted for a bet type associated with the betting spot. The player terminal 541 then locks the position of the virtual token in place onto the betting layout 420.

The betting layout 420 is configured for placement of various types of bets, such as a single-value bet type or a multi-value bet type. A single-value bet type involves a bet on an individual (single) value associated with the betting layout 420, such as the layout value "3" (at betting spot 402) on which a player has made a "straight up" bet. Additional straight-up bets are made on betting spot 404 (associated with the layout value "9"), and betting spot 408 (associated with the layout value "33"). A multi-value bet type involves a bet on a group of values associated with the roulette wheel. Examples of multi-value bet types can be found in the Ser. No. 17/948,755 application and/or the Ser. No. 17/948,633 application referenced previously. When the bets are placed (i.e., when the virtual tokens are positioned onto the betting spots 402, 404, 406, and 408), one or more highlight effects 451 appear on one or more portions (i.e., on various segments) of a roulette wheel 450, which one or more portions correspond to the selected bet-upon values from the betting layout 420. The processor selects and/or animates different highlight effects for different bet types. For example, the processor utilizes different highlight effects for single-value bet types versus multi-value bet types. Examples of highlighting single-value bet types and multi-value bet types can be found in the Ser. No. 17/948,755 application and/or the Ser. No. 17/948,633 application referenced previously.

Each of the betting spots on the betting layout 420 can have a variable bet amount related to a betting level or betting range available at the first player terminal 541. For the examples of FIG. 4 and FIG. 5, the maximum bet level (of the maximum of the variable betting range) is $10, or more specifically, the value of the virtual token 413. A minimum bet is $1, or more specifically the value of one of the virtual token 411. For the examples shown, multiple ones of the virtual token 411 can be stacked upon a betting spot up to the maximum bet level. The $1 bet (i.e., the virtual token 411) is ten percent (10%) of the maximum bet level; the $10 bet (i.e., the virtual token 413) is one hundred percent (100%) of the maximum bet level. A ratio (comprising the actual bet level (i.e., the bet amounts made) compared to the maximum bet level) is used to prorate an amount of a progressive jackpot award (e.g., see processing block 319).

A plurality of progressive jackpot award levels are funded by bets made at the plurality of player terminals via the plurality of betting layouts. For example, as shown in FIG. 4, a game enhancer table (i.e., table 530) shows various levels of game enhancement (indicated by column 531). The levels include a first enhancer level 532, a second enhancer level 534, a third enhancer level 536, and a fourth enhancer level 538. Each enhancer level provides different degrees of game enhancement. For example, the enhancer levels can apply to different degrees of multipliers (indicated by the multiplier values shown in the cells of the column 533) as well as to different degrees of progressive jackpot awards (indicated by the meters shown in the cells of column 535). The multipliers associated with the enhancer levels include a "500×" multiplier at the first enhancer level 532 (which is the highest enhancer level), a "250×" multiplier (i.e., multiplier 537A) at the second enhancer level 532, a "100×" multiplier (at the third enhancer level 536), and a "50×" multiplier (i.e., multiplier level 539A) at the fourth enhancer level 538 (which is the lowest enhancer level). Each of the progressive jackpot awards also has a differing level, which corresponds to a respective multiplier level from the plurality of multiplier levels listed in column 533. The correspondence (or correlation) between the multiplier level and the progressive jackpot level is used by the first player terminal 541 to make that particular multiplier level eligible for the progressive feature, as explained in more detail at processing block 309. Furthermore, in some embodiments, some information about each multiplier level within the game enhancement table 530 can be hidden from view. For example, the table 530 does not need to show the column 531. Furthermore, in some embodiments, the table can show the association between the multiplier level and the progressive award values in different ways, such as by associating the multiplier level with the progressive award value via the same highlight effect or graphic. Furthermore, some amounts from the table (e.g., some of the values in the column 533) can be hidden. For example, for the highest multiplier levels the "500×" multiplier label and the "250×" multiplier label can be removed from view, however, an associated multiplier level is still applied. For example, each progressive jackpot award has a reset value that is tied to the multiplier level. The multiplier level 537A, for example, is a value used in the computation of the reset value. That multiplier value would continue to be used even if not displayed. Furthermore, it should be noted that some multiplier levels do not have to be associated with a progressive jackpot award. In the example of FIG. 4 and FIG. 5, the progressive jackpot award levels have accumulated to the levels shown in the meters of column 535. For example, as illustrated in the table 530, a first progressive jackpot award value, which corresponds to the first enhancer level 532 (i.e., to the "500×" multiplier level), has accumulated to a value of $9,773.26. A second progressive jackpot award value (537B), which corresponds to the second enhancer level 534 (i.e., to the "250×" multiplier level), has accumulated to a value of $2,332.37. A third progressive jackpot award value, which corresponds to the third level 536 (i.e., to the "100×" multiplier level), has accumulated to a value of $844.61. A fourth progressive jackpot award value (539B), which corresponds to the fourth level 538 (i.e., to the "50×" multiplier level), has accumulated to a value of $206.48. Before placing the bet, each player needs to know (by jurisdictional rules) that the award amount for a progressive is dependent on a maximum bet being placed, thus below the table 530 is shown a notification that states "Values Shown with Max Bet," which means that to win the full amount of any of the progressive jackpot awards, a player must place a maximum level bet. Any bets less than maximum bet level will cause the winnable amount of the progressive jackpot award to be prorated (e.g. see processing block 319). In some instances herein, the specific enhancer levels 532, 534, 536, and 538 may be referred to more succinctly as the corresponding multiplier levels. Hence, the first enhancer level 532 may also be referred to as the "500× multiplier level;" the second enhancer level 534 as the "250× multiplier level;" the third enhancer level 536 as the "100× multiplier level;" and the fourth enhancer level 538 as the "50× multiplier level."

In one embodiment, multiple roulette game sessions/terminals can be linked to contribute to (and be eligible for) the same progressive jackpot. The 500× and 250× multiplier levels are selected (via the game controller's RNG) much less frequently than the 100× and the 50× multiplier levels. Because the 100× and 50× multiplier levels are selected more frequently, then the chances of those multipliers being ultimately applied to an award amount is higher, especially for a scenario where many terminals are linked to the same progressive. As a result, in some embodiments, the 50× and 100× multiplier levels are not linked (i.e., the progressive jackpots for those lower multiplier levels are unique for each player terminal).

In one embodiment, the odds for the roulette bets require "for 1" odds, such that, for a win of a $1 bet, the $1 bet is kept by the game/house and not paid back. The bet that is kept is used to fund the progressive jackpot pools. Using "for 1" odds can give back about a three percent (3%) hold in Percentage Return To Player (RTP). Furthermore, the "for 1" odds, causes the odds for the allowed progressive bet to change, for instance from "28 to 1" to "26 for 1." In other words, for a 1$ bet on 28 to 1 odds, the payout to the player would be 29 (i.e., Payout(28 to 1)=28×(original bet amount)+(original bet amount)). On the other hand, for a 1$ bet on 26 for 1 odds, the payout to the player would only be 26 (i.e., Payout(26 for 1)=26×(original bet amount)). This also affects the RTP (pushes it down to about 90%), which also increases the funding for the progressive jackpots.

Referring momentarily back to FIG. 3, the flow 300 continues at processing block 302, where, in response to detecting that the betting period has ended for the roulette game, the game controller selects, at random, multiplier levels to provide to the player terminals. For example, in FIG. 5, a game controller 510 (similar to game controller 210) randomly selects a number of the multiplier levels. The multiplier levels need to be paired with random betting layout values for the chance to multiply a possible win from a bet placed on one of the randomly selected layout values of the betting layout (e.g., betting layout 420). The game controller 510 can choose any number of the multipliers, however, for the sake of brevity, as shown in the example of FIG. 5, only three multiplier levels are selected at random: a first multiplier level 511 (e.g., a 50× multiplier), a second multiplier level 512 (e.g., also a 50× multiplier), and a third multiplier level 513 (e.g., a 250× multiplier). The selected multiplier levels may be referred to collectively as the current multiplier set 520, or in other words, the set of multiplier levels selected, for the current spin, to be paired with the randomly selected layout values. In one embodiment, the game controller 510 can classify the selected multiplier levels according to specific types. An example of classifying multiplier levels according to specific types can be found in the Ser. No. 17/948,755 application and/or the Ser. No. 17/948,633 application referenced previously.

In one alternate embodiment, the game controller does not select the multiplier level(s) (e.g., at processing block 302) and does not transmit the multiplier levels to each active terminal (e.g., at processing block 304). Instead, the game controller can instruct each active terminal to randomly determine their own set of multiplier levels (e.g., to select their own multiplier set 520) and then each active terminal randomly determines (e.g., using the RNG associated with the active terminal) which of the multiplier levels will be associated with the progressive feature. The flow 300 would be similar after that determination, however each active terminal would be requesting (at processing block 310) unique layout values for the multiplier sets selected by each separate active terminal. The game controller can provide unique layout values for any of those multiplier levels requested by the individual active terminal and can exclude (e.g., at processing block 312) unique values from any eligible layout value set.

Referring momentarily back to FIG. 3, the flow 300 continues at processing block 304, where the game controller, transmits the multiplier levels to the active terminals for determination of whether they will be associated with a progressive jackpot award. For example, referring to FIG. 5, the game controller 510 transfers to each of the first player terminal 541 and the second player terminal 543 the current multiplier set.

Referring momentarily back to FIG. 3, the flow 300 continues to a first loop 305 that each active terminal performs. Within the first loop 305, the active terminal performs a second loop 307 for each multiplier level that it received (via processing block 304). The first step within the second loop 307 occurs at processing block 309, where the active terminal determines whether to apply the progressive feature to each of the multiplier levels. In other words, each active player terminal determines which of the randomly selected multiplier levels will be associated with the progressive jackpot award. One reason for allowing the active player terminal to decide whether to apply the progressive feature is that the active player terminal provides an extra layer of randomization (e.g., using its own RNG). Multiple layers of randomization (e.g., at each player terminal) minimizes the possibility that any given player terminal will select the same layout values for eligibility of the same progressive jackpot award level. In one embodiment, only a small percentage of the multiplier levels are randomly selected as progressives. For example, the 100× multiplier level and the 50× multiplier level are selected more frequently than the 250× multiplier level or the 500× multiplier level. Each different multiplier level can be selected, by the active terminal, according different odds tables for each individual level. For example, in one embodiment, an odds table for the 500× multiplier level causes the 500× multiplier level to be applied to (e.g., associated with) a progressive one half of a percent (0.05%) of the time (e.g., 1 out of every 200). This allows the progressive jackpot award to get to a higher size. For example, in FIG. 4, the player terminal 541 determines (via RNG) that the progressive jackpot award 539B will be applied to the first multiplier level 511 (i.e., a 50× multiplier level). Furthermore, the player terminal 541 also determines (via RNG) that the progressive jackpot award 537B will be applied to the third multiplier level 513 (i.e., the 250× multiplier level).

Furthermore, in one embodiment, only straight up bets are eligible for selection of the progressive feature (i.e., eligibility for progressive jackpot wins are only available for (limited to) placement of straight-up bets on the betting layout).

Referring back to FIG. 3, at processing block 310 the active player terminal determines whether the selected multiplier level meets a certain condition or criterion, such as a being a specific level or type, or exceeding a specific limit or threshold. For instance, the player terminal 541 can determine whether the selected multiplier level meets or exceeds the threshold value in the setting 517. In other words, in one example, the active player terminal 541 determines (at processing block 310) whether the multiplier level is either the 250× multiplier level or the 500× multiplier level. If so, then the flow 300 continues, at processing block 311, where the active player terminal (e.g., the first player terminal 541) requests a unique layout value for the multiplier level.

The flow 300 continues at processing block 312, where the game controller selects, at random, a unique layout value from an eligible layout value set, then excludes the randomly selected layout value from the eligible layout value set until end of playing round of the roulette game. An eligible layout value set is a set of possible layout values that are eligible to be applied to the multiplier level. In some embodiments, to ensure that there is no possible chance of having two active player terminals awarding the same progressive jackpot award to the same layout value, each active player terminal can request the game controller for a unique layout value (which is unique from any other layout value provided by the game controller). In another example, the game controller can monitor the layout values generated by the player terminals to force the player terminals to select different layout values if some of them repeat amongst the player terminals.

In FIG. 5, the game controller 510 prevents the randomly selected layout value from being provided again to another player terminal during the playing round by excluding it from an eligible layout value set associated with the multiplier level. For instance, the game controller 510 responds to the requests for the random values in the order received, with each successive response in time eliminating, omitting, or otherwise excluding from the eligible layout value set any layout value that was previously selected from the eligible layout value set. For example, if the game controller 510 receives the request from the first player terminal 541 first in time, then the game controller 510 can randomly select a first layout value (via RNG) from the eligible layout value set for the 250× multiplier (i.e., the 250× eligible layout value set 591 stored in memory 593). If the progressive feature had been applied to a 500× multiplier level, then the game controller 510 would have instead chosen the first layout value from the 500× eligible layout value set 590. In one embodiment, the set of possible layout values for an eligible layout value set includes all 38 possible layout values for a straight up bet. In the example of FIG. 5, the game controller 510 selects (e.g., via RNG) the layout value "9" (i.e., value 595) and transmits that layout value 595 to the first player terminal 541 (e.g., see processing block 314), which the first player terminal 541 can use. After choosing that layout value 595 (e.g., "9"), the game controller 510 removes or eliminates the layout value 595 (i.e., "9") from the 250× eligible layout value set 591 for the remainder of the roulette playing round, thus preventing the possibility that the same layout value 595 (i.e., "9") will be randomly selected again should any other player terminal also request a unique random value from the 250× eligible layout value set 591. For instance, if the second player terminal 543 also randomly determines that the 250× multiplier level will be eligible for the progressive feature at the second player terminal 543, then the second player terminal 543 requests the game controller 510 for a unique random layout value to apply to that 250× multiplier level at the second player terminal 543. The game controller 510 receives the second player terminal's request second in time. Hence, the game controller 510 can only randomly select from amongst the remainder of the possible layout values in the 250× eligible layout value set 591 (e.g., now with only 37 possible values after excluding the already selected layout value "9"). For example, the game controller 510 selects (via RNG) the layout value "7" (i.e. layout value 597) for the second player terminal 543 and transmits that layout value 597 to the second player terminal 543 (which the second player terminal 543 uses). After randomly selecting the layout value 597 (i.e., "7"), the game controller 510 can further remove that layout value 597 (i.e., "7") from the 250× eligible layout value set 591 for the remainder of the playing round.

Referring momentarily back to FIG. 3, the flow 300 continues at processing block 314, where the game controller transmits the unique layout value to the active player terminal that requested it. For example, the game controller 510 transmits the layout value 595 (i.e., the value "9") to the first player terminal 541 to associate with the third multiplier level 513 (i.e., the 250× multiplier level).

Referring momentarily back to FIG. 3, the flow 300 continues at processing block 317, where the active player terminal pairs the unique layout value to multiplier level. For example, in FIG. 5, the first player terminal 541 pairs the layout value 595 (i.e., the "9") to the third multiplier level 513 (i.e., to the 250× multiplier level) via insertion into a layout value set 551 used by the first player terminal 541. A layout value set is a set of layout values used by a player terminal, whose number of members is equivalent to a number of randomly selected multiplier levels in the current multiplier set 520.

Referring momentarily back to FIG. 3, the flow 300 continues at processing block 321, where the active terminal animates, via a terminal display, a prorated highlight effect for the paired layout value. For example, the active player terminal prorates, based on betting level, the progressive jackpot award value associated with the multiplier level. For instance, according to some jurisdictional regulations, it is a requirement for a player to be notified, after placing a bet, of what the player is eligible to win for an associated progressive jackpot award. Therefore, on the betting layout 420, for any multiplier level that has been selected and paired, the eligible amount to win (of the associated progressive jackpot award) needs to be shown on each separate eligible layout value chosen for the multiplier level. In other words, because the player terminal can select a variable bet level, then the potential amount won for the progressive must reflect the level of the contribution. Hence, the potential amount won can also vary per bet. Thus, the potential amount of the progressive jackpot that can be won must be prorated and then displayed via the betting layout.

In FIG. 4, a maximum wager amount (also referred to herein as a maximum bet level) is $10 (i.e., the virtual token 413). As mentioned, a user of the player terminal 541 moves one of the virtual tokens 411 onto the betting spot 402, thus placing a straight up bet on the layout value "3." A straight up bet is a type of wager that is eligible for the progressive feature. The player places a $1 bet (i.e., an instance of the virtual token 411). The placed bet is referred to herein as the actual wager amount or actual bet level. Because the maximum bet level for the straight up bet is the $10 bet amount (i.e., the virtual token 413), then the actual bet level (i.e., $1 bet) is only one tenth (i.e., 10%) of the maximum bet level. A straight up bet is also placed on the betting spot 404 (associated with the layout value "9") and the betting spot 408 (associated with the layout value "33"). The actual bet level placed on the betting spot 404 (i.e. on the value "9") is the virtual token 413 (i.e., $10), which is 100% of the maximum bet level. Because the value "3" and the value "9" were randomly selected and paired, respectively with the first multiplier level 511 (i.e., a 50× multiplier level) and the third multiplier level 513 (i.e., the 250× multiplier level), and because those values ("3" and "9") were also randomly selected to have the progressive feature applied, then the values of the respective, associated progressive jackpot awards are prorated according to the ratio of the actual bet level compared to the maximum bet level. For example, the first multiplier level 511 (i.e., the first 50× multiplier level) corresponds to the progressive jackpot award value 539B, the full amount of which is $206.48. Because the player had only bet one tenth of the maximum bet on the layout value "3," then the prorated amount of the progressive jackpot award value 539B is one tenth of $206.48, or $20.64. Hence, the player terminal 541 generates a highlight effect 461 to place over the betting spot 402 of the layout value "3," which highlight effect 461 includes a meter 445 which shows the prorated amount (i.e., "$20.64"). Thus, if the roulette ball (i.e., ball 480) lands on the value "3," then only the $20.64 value is allowed to be used from the progressive jackpot award value 539B by the first player terminal 541 (e.g., awarded directly, awarded in combination with the associated multiplier value (i.e., multiplied by 50×), etc.). The prorated numbers apply to the specific bet for each layout value. For example, the player placed a bet with the maximum bet level on the layout value "9," then the prorated award amount is 100%, or the full amount, of the corresponding progressive jackpot award value (i.e., 100% of the "$2,332. 27" value of the corresponding progressive jackpot award value 537B). Thus, the player terminal 541 presents a highlight effect 463 over the betting spot 404 of the layout value "9," which highlight effect 463 includes a meter 448 which shows the prorated amount (which is in this case is the full progressive jackpot award amount of $2,332, 37). The highlight effects 461 and 463 are special highlight effects that signify (e.g., via the effect feature 444) that they are related to a "progressive" (e.g., related to the progressive feature specified in the table 530).

In some embodiments, only the highest multiplier level (or highest levels) is/are eligible to be awarded a full amount of a progressive. Some levels (e.g. less than the highest multiplier level(s)) can instead only be eligible for a reset value of the progressive. For example, if the highest level is 500×, and if betting layout value is applied to one below that level, such as the 250×, then the player would only be eligible to win 250× the bet (i.e., the bet amount times the reset value). Consequently, each individual player terminal can display, via their respective layouts, prorated amounts that are the full amount of the progressive jackpot only if the player has placed a bet (on that layout value) that is a maximum bet level. Otherwise, the prorated value shows only the reset value as being the maximum amount that the player is eligible to win from the progressive jackpot (in some embodiments, the remainder of the jackpot above the reset value would be added to the reset value during the reset procedure).

Referring back to FIG. 3, if, at processing block 309, the active terminal does not apply the progressive feature, then, at processing block 313, the active terminal selects a random layout value and pairs it with the multiplier level. In one embodiment, the active player terminal can select the random layout value via an RNG of the player terminal. In another example, the active player terminal can rely on a selected value by the game controller (e.g., a communal value). An example of communal values can be found in the Ser. No. 17/948,755 application and/or the Ser. No. 17/948,633 application referenced previously.

Further, at processing block 315, the active terminal animates, via a terminal display, a multiplier highlight effect for the paired layout value. The multiplier highlight effect is the highlight effect that does not include or involve the progressive jackpot award (i.e., the multiplier effect that is used for multiplier levels that were not randomly selected to be associated with a progressive jackpot award at processing block 309). The multiplier highlight effect may be referred to as a "non-prorated" highlight effect or a "non-progressive" highlight effect. For example, in FIG. 4, the first player terminal 541 randomly selects (via RNG) the layout value "24," which is associated with the betting spot 406. The first player terminal 541 then generates a highlight effect 462 (to place on the betting spot 406), which highlight effect 462 is different from the highlight effects 461 and 463, because it does not have highlight feature 444 nor does it have a prorated value.

Referring momentarily back to FIG. 3, the flow 300 continues at processing block 331, where the active terminals complete the loops 305 and 307, and notify the game controller that the active terminals have completed the presentation of the highlight effects (e.g., either prorated highlight effects at processing block 321 or non-prorated highlight effects at processing block 315). For example, in FIG. 5 is illustrated the final state of the highlight effects that are presented via the first player terminal 541 and the second player terminal 543. As shown for the display 403 (in FIG. 5), the highlight effects 461, 462, and 463 are presented. The second player terminal 543 presents via a display 502 (of the second player terminal 543) the highlight effects for paired layout values that were randomly selected according to a similar process used by the first player terminal 541. The highlight effects presented by the second player terminal 543 include a highlight effect 571 (which is associated with the first multiplier level 511), a highlight effect 572 (which is associated with the second multiplier level 512), and a highlight effect 573 (which is associated with the third multiplier level 513). The second player terminal 543, for instance, generates a layout value set 553. The layout values for the highlight effects 571 and 572 are randomly selected via an RNG of the second player terminal 542. However, the RNG of game controller 510 provides the unique layout value of "7" related to the third multiplier level 513. This is to ensure that the randomly selected value 597 for the second player terminal 543 (for the third multiplier level 513—i.e., the 250× multiplier level) is different from the randomly selected value 595 for the second player terminal 543 (for the same associated third multiplier level 513—i.e., the 250× multiplier level). Furthermore, it is noted that a meter 575 shows a different prorated amount than the meter 448. This is because the player at the second player terminal 543 placed a $1 bet (i.e., placed the virtual token 411) onto the betting spot for the value "7" on the betting layout presented by the second player terminal 543. As mentioned, the $1 bet is only one tenth the maximum bet level, hence the associated progressive jackpot award value 537B is prorated to be ten percent (10%) of the full amount (i.e., 10% of the "2,332.37" value is "$233.23"—shown in the meter 575). In other embodiments the proration can be based on a hit frequency normalized based on bet amount.

Referring back to FIG. 3, the flow 300 continues at processing block 332, where the game controller animates the roulette outcome. For example, in FIG. 5, the display 501 animates the ball 480, which eventually lands into a pocket 581 associated with the value "3." As a consequence, the first player terminal 541 wins the straight up bet placed on the value "3."

Referring momentarily back to FIG. 3, the flow 300 continues at processing block 334, where the game controller determines whether any progressives were won. For example, in FIG. 5, if the ball 480 eventually lands into a pocket 581 associated with the value "3," then the first player terminal 541 wins (in addition to payment of straight up bet) any accompanying multiplier and/or prorated progressive award value. For example, prorated value associated with the value "3" (for the first player terminal 541), is the $20.64 value indicated in the meter 445. As a consequence, the first player terminal 541 wins the straight up bet placed on the value "3" (along with any multiplier, e.g., the 50× multiplier) as well as the $20.64 prorated amount shown in the meter 445.

Referring momentarily back to FIG. 3, the flow 300 continues at processing block 336, where the game controller resets the progressive jackpot award(s) based on prorated awarded values. For example, if the player has won a full value of the progressive jackpot (e.g., the player had bet a maximum bet and thus was eligible for the maximum award amount), then the progressive jackpot would be reset to the level of the paid out win. In other words, in order to preserve the RTP of the game, the meter value will reset based on the amount awarded and the prorated reset amount. For example if the player bets only ½ of the maximum wager amount, then the reset seed amount will be ½ of the configured reset amount. In some embodiments, (where the multiplier is applied as part of the award), the reset amount is the base multiplier win. For example if the player has hits a 100× progressive with a bet of $5, the reset amount added to the progressive meter will be $500 (100×$5).

Referring momentarily back to FIG. 3, the flow 300 continues at processing block 338, where the game controller restores the eligible layout value set(s). For example, as mentioned, in FIG. 5 the game controller 510 excluded the layout values "9" and "7" from the 250× eligible layout value set 591. Hence, the game controller 510 would restore those excluded layout values back into the 250× eligible layout value set 591 for use in the next playing round.

Figure 6:
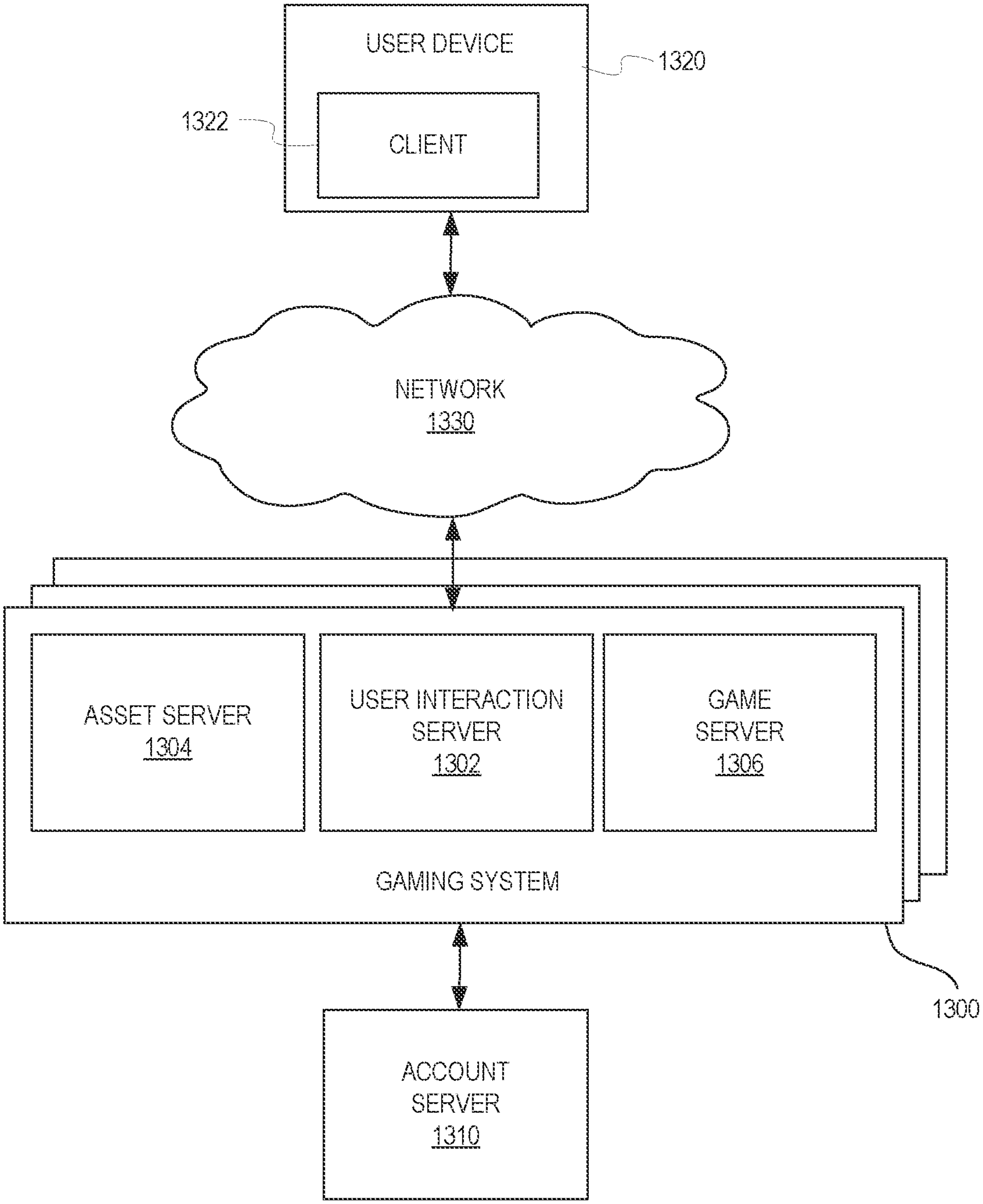
FIG. 6 is a schematic block diagram of a gaming system 1300 for implementing embodiments of waging games in accordance with at least some aspects of the disclosed concepts.

FIG. 6 is a schematic block diagram of a gaming system 1300 for implementing wagering games according to an embodiment of the present disclosure. The gaming system 1300 enables end users to access proprietary and/or non-proprietary game content through an online casino client 1322 ("the client 1322"). Such game content may include, without limitation, various types of wagering games such as card games, dice games, big wheel games, roulette, scratch off games ("scratchers"), and any other wagering game where the game outcome is determined, in whole or in part, by one or more random events.

The client 1322 may be an online casino that handles user funds, and enables play of a wide variety of casino-style games, such as roulette, card games, dice games, slot games, and electronic gaming machine (EGM) games. A player accesses the client 1322 with a user device 1320 such as a personal computer, tablet, cell phone or other mobile device over a network, such as the internet or a closed casino network. Players are able to make real money wagers through the user device 1320 and the client 1322 delivers game results to the player over a network (not shown). Losses are taken by the online casino, and wins are paid out to the player. The client 1322 handles client funds, and interacts with financial service providers to transfer funds in and out of the casino accounts. The server architecture of the client 1322 can take many forms. In one example, the client 1322 is operably connected to a separate remote gaming system 1300 that administers and delivers game results for one or more games, but in other embodiments, all of the online game play is administered in the client 1322. Exemplary gaming system 1300 delivers game results, administers game rules, and confirms wagers are made and that funds are available, but such system does not interact directly with users and does not handle player funds.

The wagering games supported by the gaming system 1300 may track player account balances and may use this information to confirm a game result can be delivered. The same system could be used to administer play-for-fun games in which account balances are tracked but do not represent real currency.

A virtual credits option may be used with wagering games in which credits (or other symbols) may be issued to a player to be used for the wagers. A player may be credited with credits in any way allowed, including, but not limited to, a player purchasing credits; being awarded credits as part of a contest or a win event in this or another game (including non-wagering games); being awarded credits as a reward for use of a product, casino, or other enterprise, time played in one session, or games played; or may be as simple as being awarded virtual credits upon logging in at a particular time or with a particular frequency, etc. Although credits may be won or lost, the ability of the player to cash out credits may be controlled or prevented. In one example, credits acquired (e.g., purchased or awarded) for use in a play-for-fun game may be limited to non-monetary redemption items, awards, or credits usable in the future or for another game or gaming session. The same credit redemption restrictions may be applied to some or all of credits won in a wagering game as well.

An additional variation includes web-based sites having both play-for-fun and wagering games, including issuance of free (non-monetary) credits usable to play the play-for-fun games. This may attract players to the site and to the games before they engage in wagering. In some embodiments, a limited number of free or promotional credits may be issued to entice players to play the games. Another method of issuing credits includes issuing free credits in exchange for identifying friends who may want to play. In another embodiment, additional credits may be issued after a period of time has elapsed to encourage the player to resume playing the game. The gaming system 1300 may enable players to buy additional game credits to allow the player to resume play. Objects of value may be awarded to play-for-fun players, which may or may not be in a direct exchange for credits. For example, a prize may be awarded or won for a highest scoring play-for-fun player during a defined time interval. All variations of credit redemption are contemplated, as desired by game designers and game hosts (the person or entity controlling the hosting systems).

The gaming system 1300 may include a gaming platform that establishes a portal for an end user to access via a user device 1320 to a wagering game hosted by a game server 1306 through a user interaction server 1302. The user device 1320 may communicate with user interaction server 1302 using a network 1330 (e.g., the Internet). The user interaction server 1302 may communicate with the game server 1306 and provide game information, such as graphical displays and game interactions to the user. In some embodiments, the functionality of the gaming system 1300 may be incorporated into the online casino client 1322. In some embodiments, the user device 1320 communicates with a game provided by the game server 1306, while other embodiments may include a plurality of user devices 1320 configured to communicate and provide end users with access to the same game provided by the game server 1306. In addition, a plurality of end users may be permitted to access a single user interaction server 1302, or a plurality of user interaction servers 1302, to access the game server 1306.

The user interaction server 1302 may communicate with the user device 1320 through the client 1322 to enable access to the gaming system 1300. The user may be unaware that the game is being administered by gaming system 1300 and not the client 1322. In embodiments, the user device 1320 includes a user display that includes game assets delivered from the asset server 1304 from gaming system 1300, as well as casino assets (such as the casino name, logo and other distinctive graphics) delivered by the client 1322. The user interaction server 1302 may enable a user to create and access a user account and interact with gaming server 1306. The user interaction server 1302 may enable users to initiate new games, join existing games, and interface with games being played by the user.

In some embodiments, the user interaction server 1302 may also provide the client 1322 for execution on the user device 1320 for accessing the gaming system 1300. The client 1322 provided by the gaming system 1300 for execution on the user device 1320 can comprise a variety of implementations according to the user device 1320 and method of communication with the gaming system 1300. In one embodiment, the user device 1320 connects to the gaming system 1300 using a web browser, and the client 1322 executes within a browser window or frame of the web browser. In another embodiment, the client 1322 is a stand-alone executable on the user device 1320.

In one embodiment, the client 1322 may comprise a relatively small amount of script (e.g., JAVASCRIPT®), also referred to as a "script driver," including scripting language that controls an interface of the client 1322. The script driver may include simple function calls requesting information from the gaming system 1300. In other words, the script driver stored in the client 1322 may merely include calls to functions that are externally defined by, and executed by, the gaming system 1300. As a result, the client 1322 may be characterized as a "thin client." As that term is used herein, the client 1322 may be little more than a script player. The client 1322 may simply send requests to the gaming system 1300 rather than performing logic itself for the games administered by gaming system 1300. The client 1322 may perform logic for other games that are not administered by gaming system 1300. For example, gaming system 1300 may administer an online casino's card games while all other games are administered by the client 1322. The client 1322 receives player inputs, and the player inputs are passed to the gaming system 1300 for processing and executing the wagering game. In one embodiment, this includes providing specific graphical display information to the client 1322 as well as game outcomes.

In other embodiments, the client 1322 comprises an executable file rather than a script. In that case, the client 1322 may do more local processing than does a script driver, such as calculating where to show what game symbols upon receiving a game outcome from game server 1306 through user interaction server 1302. In one embodiment, it may be that portions of an asset server 1304 are loaded onto the client 1322 and are used by the client 1322 in processing and updating graphical displays. Due to security and integrity concerns, some embodiments will have the bulk of the processing of the game play performed in the gaming system 1300. However, some embodiments may include significant game processing by the client 1322 when the client and user device 1320 are considered trustworthy or when there is reduced concern for security and integrity in the displayed game outcome. In most embodiments, it is expected that some form of data protection, such as end-to-end encryption, will be used when data is transported over network 1330. Network 1330 may be any network, including, but not limited to, the Internet, a communications network, a cell-phone network, a mobile device network, a wireless network, etc.

In an embodiment where the client 1322 implements further logic and game control methodology beyond the thin client, the client 1322 may parse and define player interactions prior to passing the player interactions to the gaming system 1300. Likewise, when the client 1322 receives a gaming interaction from the gaming system 1300, the client 1322 may be configured to determine how to modify the display as a result of the gaming interaction. The client 1322 may also allow the player to change a perspective or otherwise interact with elements of the display that do not change aspects of the game.

The gaming system 1300 may include the asset server 1304, which may host various media assets (e.g., audio, video, and image files) that may be sent to the client 1322 for presenting the various wagering games to the end user. In other words, in this embodiment, the assets presented to the end user may be stored separately from the client 1322. In one embodiment, the client 1322 requests the assets appropriate for the game played by the user; in other embodiments, especially those using thin clients, just those assets that are needed for a particular display event will be sent by game server 1306 when the game server 1306 determines they are needed, including as few as one asset. In one example, the client 1322 may call a function defined at the user interaction server 1302 or asset server 1304, which may determine which assets are to be delivered to the client 1322 as well as how the assets are to be presented by the client 1322 to the end user. Different assets may correspond to the various clients that may have access to the game server 1306 or to different games to be played.

The game server 1306 is configured to perform game play methods and determine game play outcomes that are provided to the user interaction server 1302 to be transmitted to the user device 1320 for display on the end user's computer. For example, the game server 1306 may include game rules for one or more wagering games, such that the game server 1306 controls some or all of the game flow for a selected wagering game as well as the determined game outcomes. The game server 1306 may include pay tables and other game logic. The game server 1306 also performs random number generation for determining random game elements of the wagering game. In one embodiment, the game server 1306 is separated from the user interaction server 1302 by a firewall or other method of preventing unauthorized access to the game server 1306 from the general members of the network 1330.

The user device 1320 may present a gaming interface to the player and communicate the user interaction to the gaming system 1300. The user device 1320 may be any electronic system capable of displaying gaming information, receiving user input, and communicating the user input to the gaming system 1300. As such, the user device 1320 can be a desktop computer, a laptop, a tablet computer, a set-top box, a mobile device (including, but not limited to, a smartphone), a kiosk, a terminal, or another computing device. The user device 1320 operating the client 1322 may comprise an interactive electronic gaming system, such the gaming system 100 (see FIG. 1). The client 1322 may be a specialized application or may be executed within a generalized application capable of interpreting instructions from an interactive gaming system, such as a web browser.

The client 1322 may interface with an end user through a web page or an application that runs on a device including, but not limited to, a smartphone, a tablet, or a general computer, or the client 1322 may be any other computer program configurable to access the gaming system 1300. The client 1322 may be illustrated within a casino webpage (or other interface) indicating that the client 1322 is embedded into a webpage, which is supported by a web browser executing on the user device 1320.

In one embodiment, the gaming system 1300 may be operated by a different entity than the operator of the client 1322. The hardware of gaming system 1300 may be located remotely from the client 1322. The user device 1320 may be operated by a third party, such as a casino or an individual, that links to the gaming system 1300, which may be operated, for example, by a wagering game service provider. Therefore, in some embodiments, the user device 1320 and the client 1322 may be operated by a different administrator than the operator of the game server 1306, and the user device 1320 and the client 1322 may also be operated by separate administrators. In other words, the user device 1320 may be part of a third-party system that does not administer or otherwise control the gaming system 1300 or game server 1306.

In another embodiment, the user interaction server 1302 and asset server 1304 are provided by a third-party system. For example, a gaming entity (e.g., a casino) may operate the user interaction server 1302 or user device 1320 to provide its customers access to game content managed by a different entity that may control game server 1306, amongst other functionality. In some embodiments, these functions are operated by the same administrator. For example, a gaming entity (e.g., a casino) may elect to perform each of these functions in-house, such as providing both the access to the user device 1320 and the actual game content and providing administration of the gaming system 1300.

The gaming system 1300 may communicate with one or more external account servers 1310, optionally through another firewall. For example, the gaming system 1300 itself may not directly accept wagers or issue payouts. That is, the gaming system 1300 may facilitate online casino gaming but may not be part of a self-contained online casino itself. Instead, the gaming system 1300 may facilitate the play of wagering games owned and controlled by a company offering games and gaming products and services, such as SHFL entertainment, Inc. Another entity (e.g., a casino or any account holder or financial system of record) may operate and maintain its external account servers 1310 to accept bets and make payout distributions. The gaming system 1300 may communicate with the account servers 1310 to verify the existence of funds for wagering and to instruct the account server 1310 to execute debits and credits.

In some embodiments, the gaming system 1300 may directly accept bets and make payout distributions, such as in the case where an administrator of the gaming system 1300 operates as the client 1322. As discussed above, the gaming system 1300 may be integrated within the operations of a casino rather than separating out functionality (e.g., game content, game play, credits, debits, etc.) among different entities. In addition, for play-for-fun wagering games, the gaming system 1300 may issue credits, take bets, and manage the balance of the credits according to the game outcomes, but the gaming system 1300 may not permit payout distributions or be linked to an account server 1310 that permits payout distributions. Such credits may be issued for free, through purchase, or for other reasons, without the ability for the player to cash out. Such play-for-fun wagering games may be administered on platforms that do not permit traditional gambling, such as to comply with jurisdictions that do not permit online gambling. In embodiments where a user device 1320 accesses games administered by gaming system 1300 through the client 1322, the account server 1310 contains "mirror accounts" that track account balances to confirm wagers have been made and there are funds to support the wagers before delivering game results. In this embodiment, no actual player funds are handled by the account server 1310.

The gaming system 1300 may be configured in many ways, from a fully integrated single system to a distributed server architecture. The asset server 1304, the user interaction server 1302, the game server 1306, and the account server 1310 may be configured as a single, integrated system of code modules running on a single server or machine, where each of the servers is functionally implemented on a single machine. In such a case, the functionality described herein may not be implemented as separate code modules. The asset server 1304, the user interaction server 1302, the game server 1306, and the account server 1310 may also be implemented as a plurality of independent servers, each using its own code modules running on a separate physical machine, and may further include one or more firewalls between selected servers (depending on security needs). Each server could communicate over some kind of networked connection, potentially as varied as that described for network 1330. Further, each single server shown in FIG. 6 may be implemented as a plurality of servers with load balancing and scalability factors built into the embodiment. All such embodiments and variations are fully contemplated.

Additional features may be supported by the game server 1306, such as hacking and cheating detection, data storage and archival, metrics generation, messages generation, output formatting for different end user devices, as well as other features and operations. For example, the gaming system 1300 may include additional features and configurations as described in U.S. patent application Ser. No. 13/353,194, filed Jan. 18, 2012, and U.S. patent application Ser. No. 13/609,031, filed Sep. 10, 2012, both titled "NETWORK GAMING ARCHITECTURE, GAMING SYSTEMS, AND RELATED METHODS," the disclosures of which are incorporated herein in their entirety by this reference.

The network 1330 may enable communications between the user device 1320 and the gaming system 1300, and the user device 1320 and the online casino client 1322. A network may also connect the gaming system 1300 and account server 1310, and, further, one or more networks may interconnect one or more of the other servers shown collectively as the game system 1300. In one embodiment, the network 1330 uses standard communications technologies and/or protocols. Thus, the network 1330 can include links using technologies such as Ethernet, 802.11, worldwide interoperability for microwave access (WIMAX®), 3G, digital subscriber line (DSL), asynchronous transfer mode (ATM), INFINIBAND®, PCI Express Advanced Switching, etc. Similarly, the networking protocols used on the network 1330 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 1330 can be represented using technologies and/or formats including the hypertext markup language (HTML), the extensible markup language (XML), etc. In addition, all or some of the links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above. Depending upon the embodiment, the network 1330 can include links comprising one or more networks such as the Internet.

Figure 7:
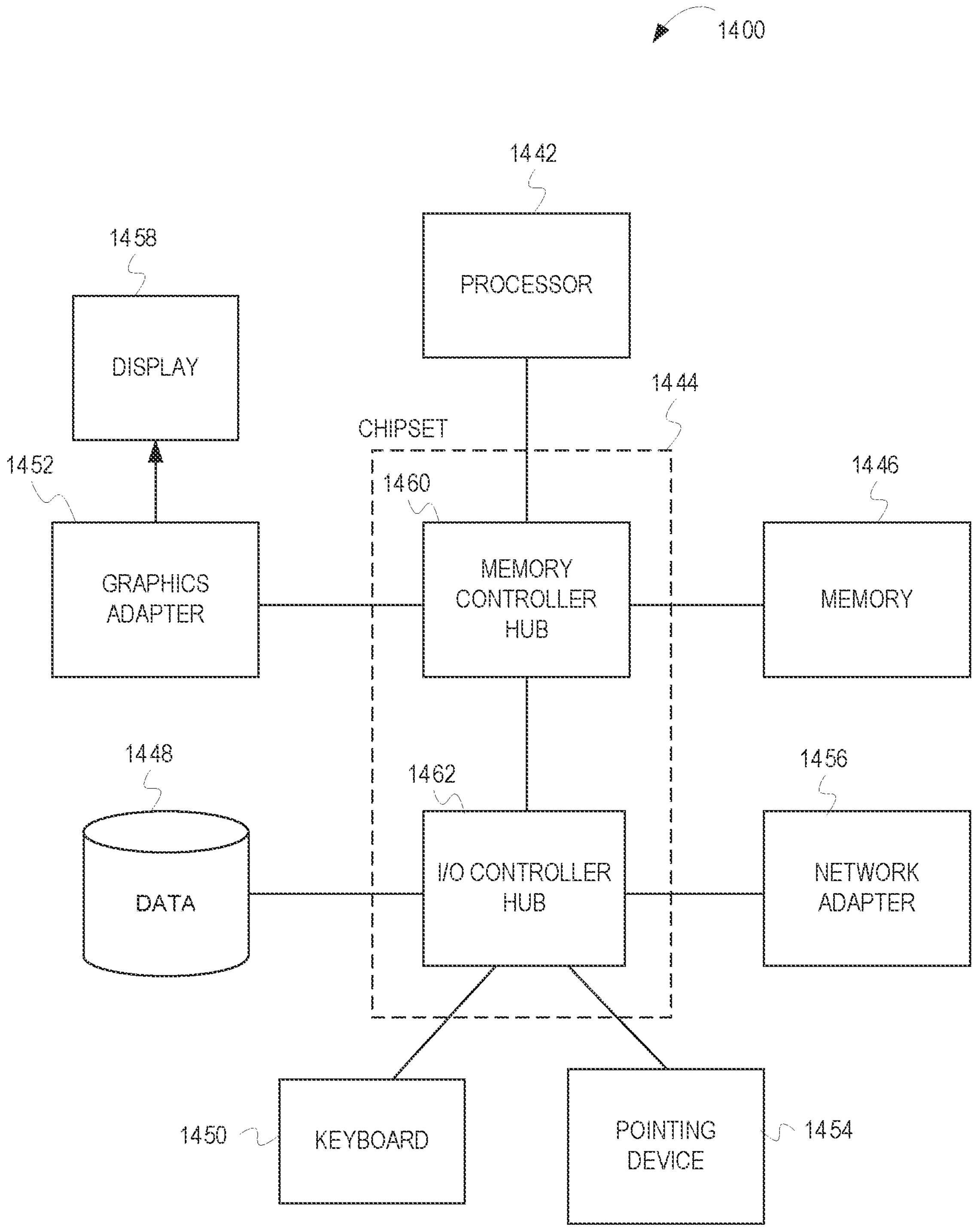
FIG. 7 is a block diagram of a computer 1400 for acting as a gaming system for implementing embodiments of wagering games according to at least some aspects of the disclosed concepts.

FIG. 7 is a block diagram of a computer system 1400 according to one or more embodiments. In one embodiment, the computer system 1400 can be used for acting as at least some portion of the gaming system 100 (see FIG. 1) or the gaming system 1300 (see FIG. 6). The computer system 1400 includes at least one processor 1442 coupled to a chipset 1444, as indicated in dashed lines. Also coupled to the chipset 1444 are memory 1446, a storage device 1448, a keyboard 1450, a graphics adapter 1452, a pointing device 1454, and a network adapter 1456. A display 1458 is coupled to the graphics adapter 1452. In one embodiment, the functionality of the chipset 1444 is provided by a memory controller hub 1460 and an I/O controller hub 1462. In another embodiment, the memory 1446 is coupled directly to the processor 1442 instead of to the chipset 1444.

The storage device 1448 is any non-transitory computer-readable storage medium, such as a hard drive, a compact disc read-only memory (CD-ROM), a DVD, or a solid-state memory device (e.g., a flash drive). The memory 1446 holds instructions and data used by the processor 1442. The pointing device 1454 may be a mouse, a track pad, a track ball, or another type of pointing device, and it is used in combination with the keyboard 1450 to input data into the computer system 1400. The graphics adapter 1452 displays images and other information on the display 1458. The network adapter 1456 couples the computer system 1400 to a local or wide area network.

As is known in the art, the computer system 1400 can have different and/or other components than those shown in FIG. 7. In addition, the computer system 1400 can lack certain illustrated components. In one embodiment, the computer system 1400 acting as the gaming system 100 (FIG. 1) lacks the keyboard 1450, pointing device 1454, graphics adapter 1452, and/or display 1458. Moreover, the storage device 1448 can be local and/or remote from the computer system 1400 (such as embodied within a storage area network (SAN)). Moreover, other input devices, such as, for example, touch screens may be included.

The network adapter 1456 (may also be referred to herein as a communication device) may include one or more devices for communicating using one or more of the communication media and protocols discussed above with respect to FIG. 1.

In addition, some or all of the components of this general computer system 1400 of FIG. 7 may be used as part of the processor and memory discussed above with respect to the systems or devices described for FIG. 1, FIG. 2, FIG. 3, FIG. 4, FIG. 5, or FIG. 6.

The gaming system 100 (FIG. 1) and/or the gaming system 1300 (FIG. 6) may comprise several such computer systems 1400. The gaming system 100 may include load balancers, firewalls, and various other components for assisting the gaming system 100 to provide services to a variety of user devices.

The computer system 1400 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 1448, loaded into the memory 1446, and executed by the processor 1442.

Figure 8:
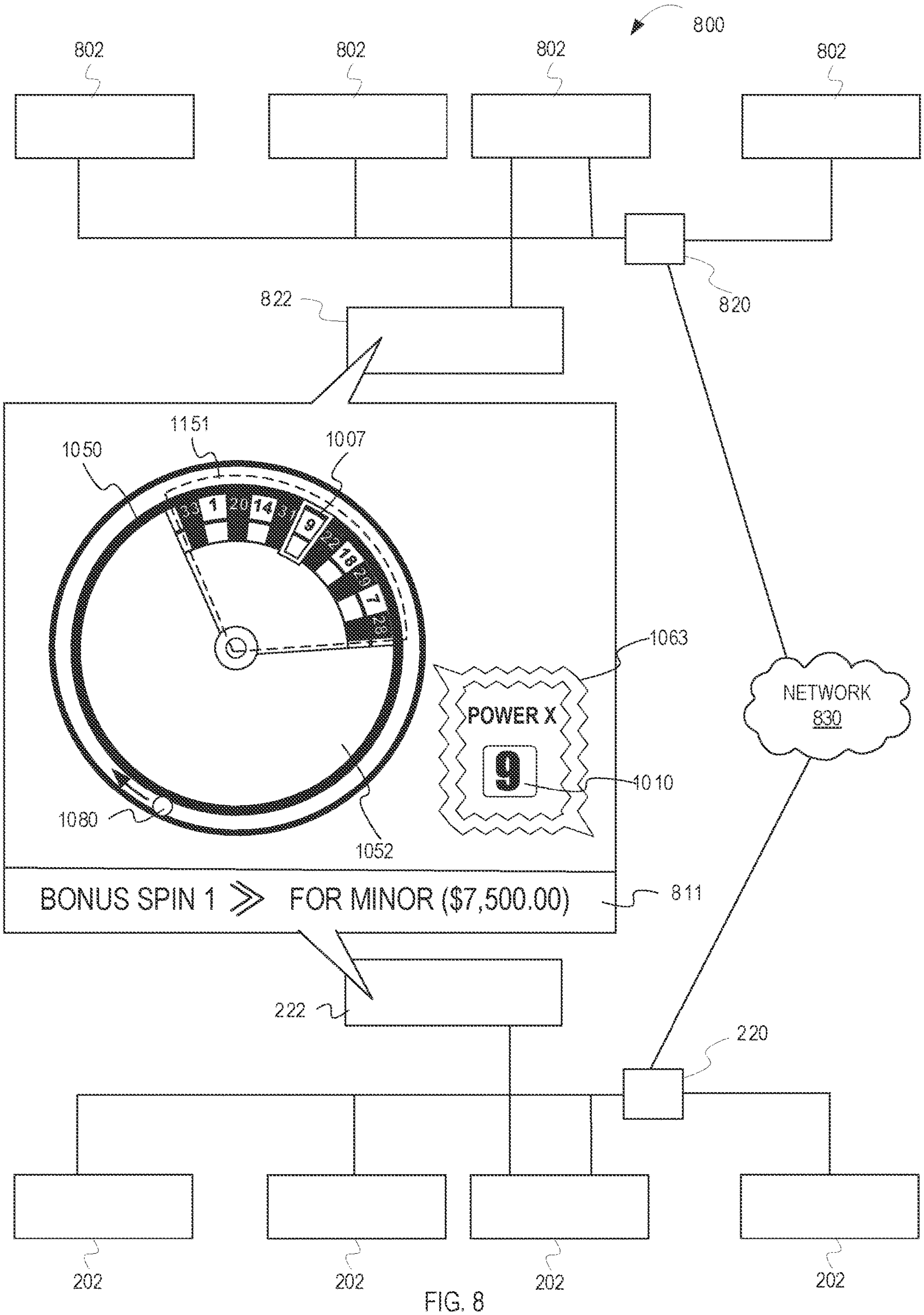
FIG. 8 is a schematic block diagram of a gaming system architecture 800 according to at least some aspects of the disclosed concepts.

FIG. 8 is a schematic block diagram of a gaming system architecture ("architecture 800") according to at least some aspects of the disclosed concepts. The architecture 800 includes elements of the architecture 200 mentioned in FIG. 2. For example, the architecture 800 includes a first plurality of player terminals 202 communicatively coupled via a network communication device (e.g., switch 220) to a virtual croupier display 222. The virtual croupier display 222 presents instructions from a virtual croupier for a group roulette game (e.g., as presented by video device 158 in FIG. 1 and as described in FIG. 2). For example, a game engine (e.g., game controller 210 mentioned in FIG. 2), is associated with one of the player terminals 202. The game controller 210 executes roulette-outcome logic, resets won progressive values, and uses a random number generator (RNG) to (a) determine a final resting position for a roulette ball, (b) randomly select and provide multiplier levels to active player terminals, (c) randomly select and provide layout values for some multiplier levels, (d) randomly select and provide unique layout values for progressive-related multiplier levels, (e) conduct a progressive bonus game, (f) etc. Furthermore, each of the player terminals 202 includes a game client (e.g., game client 206) that subscribes to a game service (e.g., game service 204) associated with the roulette game.

In addition, the architecture 800 also includes a second plurality of player terminals 802 communicatively coupled via a network communication device (e.g., via switch 820) to a virtual croupier display 822. The second plurality of player terminals are similar to the first plurality of player terminals. The virtual croupier display 822 presents instructions from a virtual croupier for the group roulette game. The second plurality of player terminals 802 are communicatively coupled to the first plurality of player terminals 202 via a network 830. The group roulette game presented via the second plurality of player terminals 802 (and/or via the virtual croupier display 822) may be similar to the roulette game mentioned previously in FIG. 2 through 5. In one embodiment, the same game controller (e.g., game controller 210) presents a same instance of a base game (i.e., the roulette game) via the first plurality of player terminals 202 and via the second plurality of player terminals 802 and also presents either a shared bonus game and/or presents similar versions of the same bonus game. However, in another embodiment, a first game controller (e.g., game controller 210) presents a first instance of the base game (i.e., the roulette game) via the first plurality of player terminals 202 while a second game controller presents a second, separate instance of the base game via the second plurality of player terminals 802. However, both the first plurality of player terminals 202 and the second plurality of player terminals 802 may be linked to each other to present the same bonus game and/or to present similar versions of the bonus game (e.g., concurrently).

Figure 9:
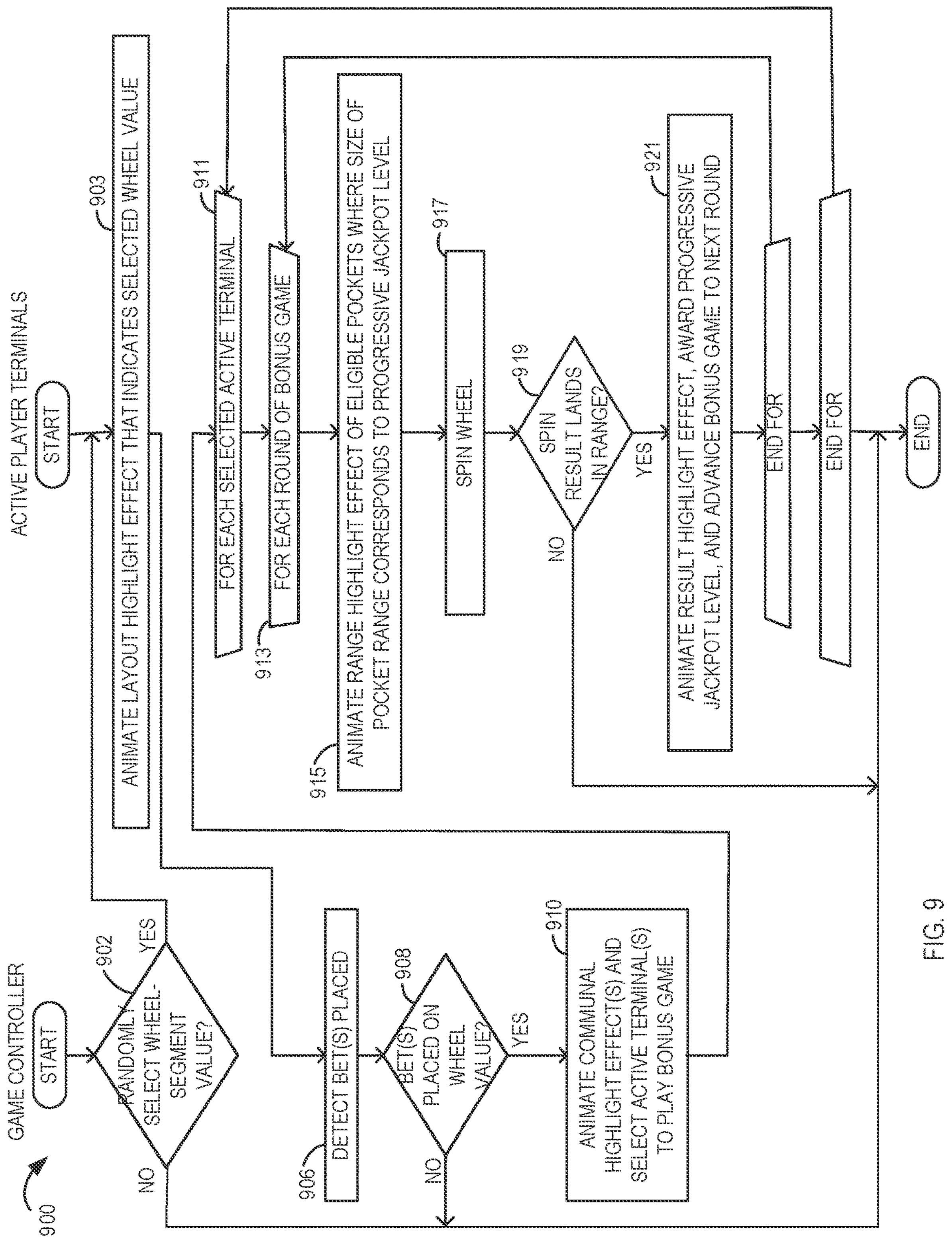
FIG. 9 is a flowchart for controlling roulette bonus-game highlight features according to at least some aspects of the disclosed concepts.

In one example, the occurrence of a certain trigger or event (e.g., the random selection of the wheel-segment value described at processing block 902 of FIG. 9), initiates the bonus game that utilizes, as rewards, one or more progressive jackpots (or one or more progressive jackpot levels) to which any of the player terminals 202 and/or 802 are linked and for which any active player terminal is eligible to participate (given certain betting requirements are met, such as betting a specific bet type (e.g., a single-bet type), betting on a specific bet spot or combination of bet spots, betting a threshold betting amount, etc.). The flow 900 below describes one example of conducting the bonus game. During the bonus game, one or more communal displays (e.g., virtual croupier displays 222 and 822) present communal information for the bonus game. For instance, as shown in FIG. 8, the communal information may include highlight effects of a bonus-round spin, including a highlight effect 1007 of a randomly selected wheel-segment value (e.g., the value "9") on the wheel 1080. The randomly-selected wheel segment value (e.g., "9") may further be highlighted by a layout highlight effect 1063, which specifies a corresponding layout value 1010 (i.e., the layout value "9") to indicate that the layout value 1010 was bet upon (e.g., see virtual token 413 in FIG. 10) by the participant player terminal, and thus triggered the bonus game for that participant player terminal.

The information shown on the communal displays may further include details of the bonus game that are presented for view by the community of active player terminals as the bonus game occurs (or as a replay). The details presented may include a position of a roulette ball 1080 relative to the pockets of the wheel 1050. The presented details may also include a range highlight effect 1151 that highlights a range (section(s), portion(s), etc.) of the wheel 1050 (e.g., pockets) that are eligible to win during a spin (e.g., round) of the bonus game. For example, if, during a bonus game round, the ball 1080 lands within any of the pockets within the range (e.g., if the ball lands on any of the values "33," "1," "20," "14," "31," "9," "22," "18," "29," "7," or "28."), then the spin for the bonus game round is considered a win. The remainder of the pockets (i.e., the non-eligible pockets, or the losing pockets) are deemphasized via a mask highlight effect (mask 1052) to indicate that if the ball 1080 lands in any of the pockets behind the mask 1052, then the spin for the bonus game round is considered a loss. The mask 1052 may be opaque or semi-transparent (e.g., the mask highlight effect may dim or reduce the characteristics (e.g., color, lighting, resolution, text, etc.) of the appearance of the non-eligible pockets). In other embodiments, the mask 1052 can instead be a border highlight effect (or other highlight effect) that surrounds, outlines or emphasizes the outer edges or borders of at least some portion of each of the non-eligible pockets (e.g., around the outer edges of the range of non-eligible pockets). Furthermore, the communal display(s) 222 and 822 can further present bonus game information 811, such as bonus game details, bonus game status, bonus game progress, bonus game spin results, etc.

FIG. 9 is a flowchart of a flow (900) for controlling roulette highlight features for a bonus game according to at least some aspects of the disclosed concepts. FIG. 10 through FIG. 16 are diagrams of controlling progressive jackpot highlight features of the bonus game according to at least some aspects of the disclosed concepts. FIG. 8 and FIG. 10 through FIG. 16 will be referred to concurrently with the description of the flow 900. It should be noted that while some embodiments disclosed mention one or more devices that perform an action, the processor that performs the action may one of one or more processors that are available by a gaming system and/or distributed across a gaming network.

Referring to FIG. 9, the flow 900 starts at processing block 902, where a game controller determines whether a wheel-segment value is randomly selected to trigger a bonus game. The game controller can utilize a random number generator to randomly select the wheel-segment value from the set of numbers on the wheel segments of the roulette wheel. However, the game controller may determine to randomly select the wheel-segment value based on certain conditions or criteria. For example, the game controller may only randomly select the wheel-segment value one out of every certain number of roulette games played. For example, the game controller can select (for the bonus game) a random number (e.g., via use of a random number generator) during one out of every four roulette base games played. Thus, in at least one embodiment, the chances of a bonus game being triggered is only available at least one of every four base-game roulette spins. Other embodiments can include randomly selecting the wheel-segment value at other intervals or based on other conditions (e.g., randomly select the wheel-segment value one out of every three games, randomly selects the wheel-segment value one out of every five games, randomly select the wheel-segment value according to a combination of intervals or conditions, etc.). Referring to the example shown in FIG. 10, the game controller randomly selects (after all bets have been placed for a roulette game) the wheel-segment value "9."

Referring momentarily back to FIG. 9, the flow 900 continues at processing block 903 where each of the active terminals animates a layout highlight effect that indicates the randomly selected wheel-segment value. For example, referring again to FIG. 10, in response to the game controller randomly selecting the wheel-segment value "9," the active player terminal presents, via user interface 1012 (of the player terminal) a layout highlight effect 1063, which indicates the corresponding layout value 1010 (i.e., the value "9" on the betting spot 1004 of the layout 1020, which betting spot 1004 corresponds to the randomly selected wheel-segment value of "9"). The layout highlight effect 1063 can further specify a meter 1048 that indicates a pro-rated value of the amount of the progressive level award that is attainable by the player terminal based on a percentage of a maximum bet (or other bet threshold) placed on the layout value (e.g., see FIG. 4 for additional details).

Figure 10:
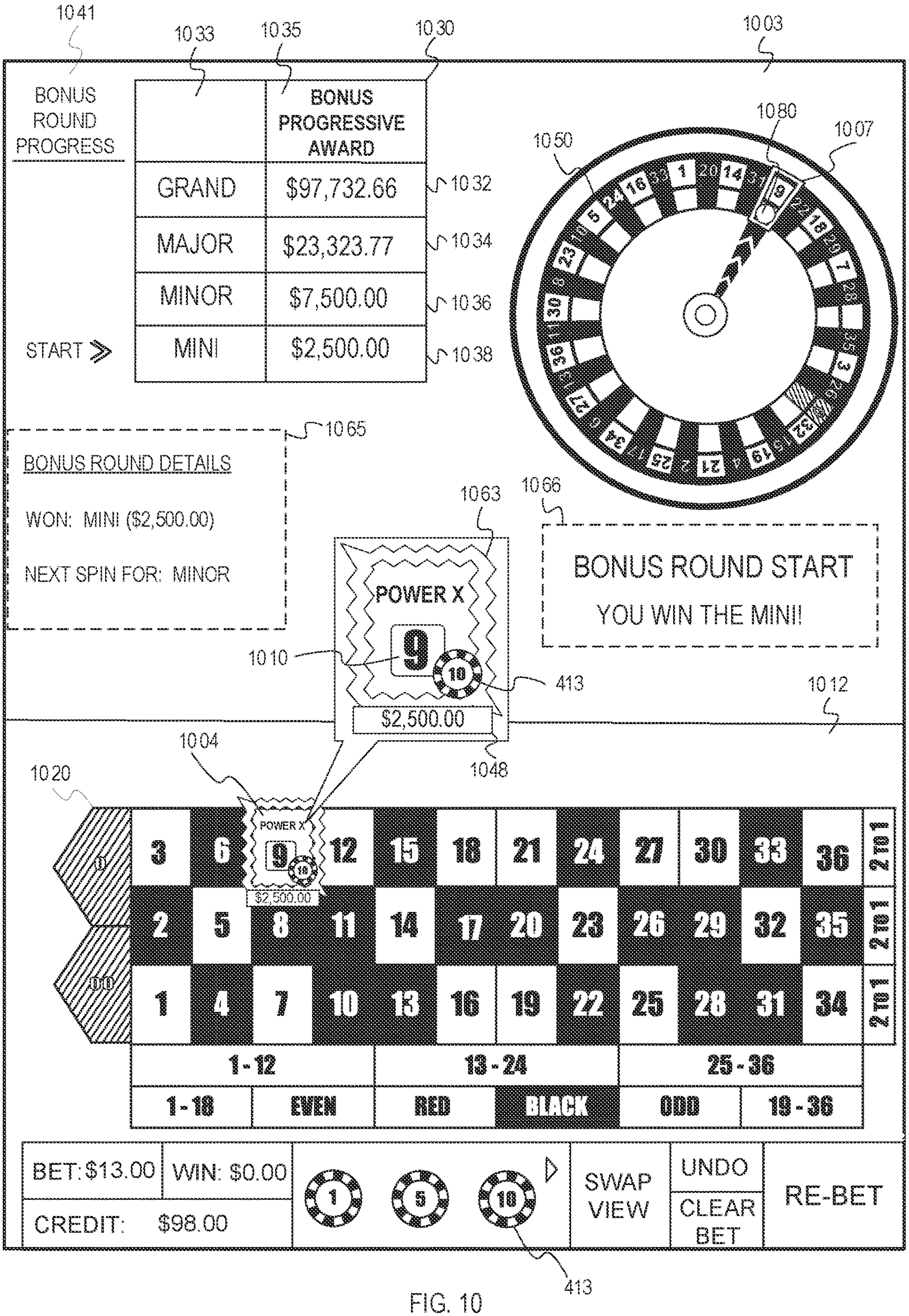
FIG. 10 through FIG. 16 are diagrams of controlling one or more progressive jackpot highlight features of a bonus game according to at least some aspects of the disclosed concepts.

Referring momentarily back to FIG. 9, the flow 900 continues at processing lock 906 where the game controller detects whether any bets were placed, by any active player terminals, on the randomly selected wheel-segment value for the bonus game. For example, in addition to the game controller randomly selecting the wheel-segment value, the game controller can further assess whether other criteria have been satisfied to determine whether the bonus game round is triggered for a particular player terminal. For example, randomly selecting the wheel-segment value may be only a first criterion for triggering a bonus game. An additional criterion that may need to be satisfied before a bonus game is triggered includes determining whether a player terminal placed a bet (e.g., a single-bet type, straight up bet, etc.) on the randomly selected value. In one embodiment, the game controller actively polls or requests information from the player terminals to determine what bets were placed on which layout values. The active player terminals notify the game controller of placement of a plurality of roulette bets made via betting layouts presented on the active player terminals. Referring to FIG. 10, a bonus game is triggered via an active player terminal. For instance, the game controller detects that the virtual token 413 was placed (as a bet) on the betting spot 1004 which corresponds to the layout value 1010 (i.e., the layout value "9") which in turn corresponds to the randomly selected wheel-segment value (i.e., the wheel segment value "9"). The game controller further instructs the active player terminal to present bonus game content (including highlight effects), via display 1003 (of the active player terminal). For example, the display 1003 presents an instance of the wheel 1050. The wheel 1050 indicates the results of the base-game roulette spin, which landed in the pocket for the randomly selected wheel-segment value of "9." The game controller detects that the player terminal had bet on the randomly selected value (e.g., via a straight-up bet) for the base game. Hence, the active player terminal wins the straight up bet, and the bonus game is triggered.

The bonus game includes a bonus game table 1030 which correlates a progressive level 1033 with an award value 1035 (e.g., an accumulated pool value for the progressive jackpot level). For example, a first level (i.e., the "MINI" level) is the lowest level of the progressive levels (i.e., has the lowest reset value of all the progressive levels, corresponds to a lowest multiplier (or other enhancer) value associated with the progressive levels, etc.). The first level is correlated (via the table 1030) with the award value 1035 for the "MINI". Details for the first level are specified in row 1038, including correlating the award value 1035 of the first level (i.e., "$2,500.00") with the first level name (i.e., "MINI"). A second level (i.e., the "MINOR") is correlated (via the table 1030) with the award value 1035 for the "MINOR" (i.e., the "$7,500.00"). Details for the second level are specified in row 1036, including correlating the award value 1035 of the second level (i.e., "$7,500.00") with the second level name (i.e., "MINOR"). The second level is higher than the first level (e.g., the second level has a greater reset value than the first level, the second level corresponds to a higher multiplier (or other enhancer) value than the first level, etc.). A third level (i.e., the "MAJOR") is correlated (via the table 1030) with the award value for the "MAJOR" (i.e., the "$23,323.77"). Details for the third level are specified in row 1034, including correlating the award value 1035 of the third level (i.e., "$23,323.77") with the third level name (i.e., "MAJOR"). The third level is higher than the first level or the second level (e.g., the third level has a greater reset value than the second level, the third level corresponds to a higher multiplier (or other enhancer) value than the second level, etc.). A fourth level (i.e., the "GRAND") is correlated (via the table 1030) with the award value 1035 for the "GRAND" (i.e., the "$97,732.66"). Details for the fourth level are specified in row 1032, including correlating the award value 1034 of the fourth level (i.e., "$97,732.66") with the fourth level name (i.e., "GRAND"). The fourth level is higher than the first level, the second level, or the third level (e.g., the fourth level has a greater reset value than the third level, the fourth level corresponds to a higher multiplier (or other enhancer) value than the third level, etc.).

In the example shown in FIG. 10, the game controller awards the first level of the progressive jackpot for triggering the bonus game. A bonus round tracker 1041 tracks the bonus game spins and their past occurrences. Bonus round details 1065 specify any results that occurred from a spin. The bonus round details 1065 also specify the next progressive level for which the next successive round of the bonus game will be played. A bonus round message 1046 further specifies details about the current bonus round.

Referring momentarily back to FIG. 9, if the game controller determines (at processing block 906) that any active terminal had placed a bet (during the base game) on the randomly selected wheel-segment value, then the flow 900 continues at processing block 910 where the game controller animates communal highlight effects on one or more communal displays associated with the roulette game (e.g., as illustrated in FIG. 8), and selects the qualifying active terminal(s) to participate in the bonus game.

The flow 900 continues at processing block 911 where a first loop occurs where each of the selected active terminals that qualifies for the bonus game gets a chance to play the bonus game. FIG. 10 through FIG. 16 illustrates one iteration of the first loop (i.e., processing block 911) for a single active player terminal selected (based on the qualifying criteria) to play the bonus game. Furthermore, for each active player terminal selected to play the game, the flow 900 continues at processing block 913 where a second loop occurs where the given selected active terminal participates in one or more additional rounds of the bonus game.

Figure 11:
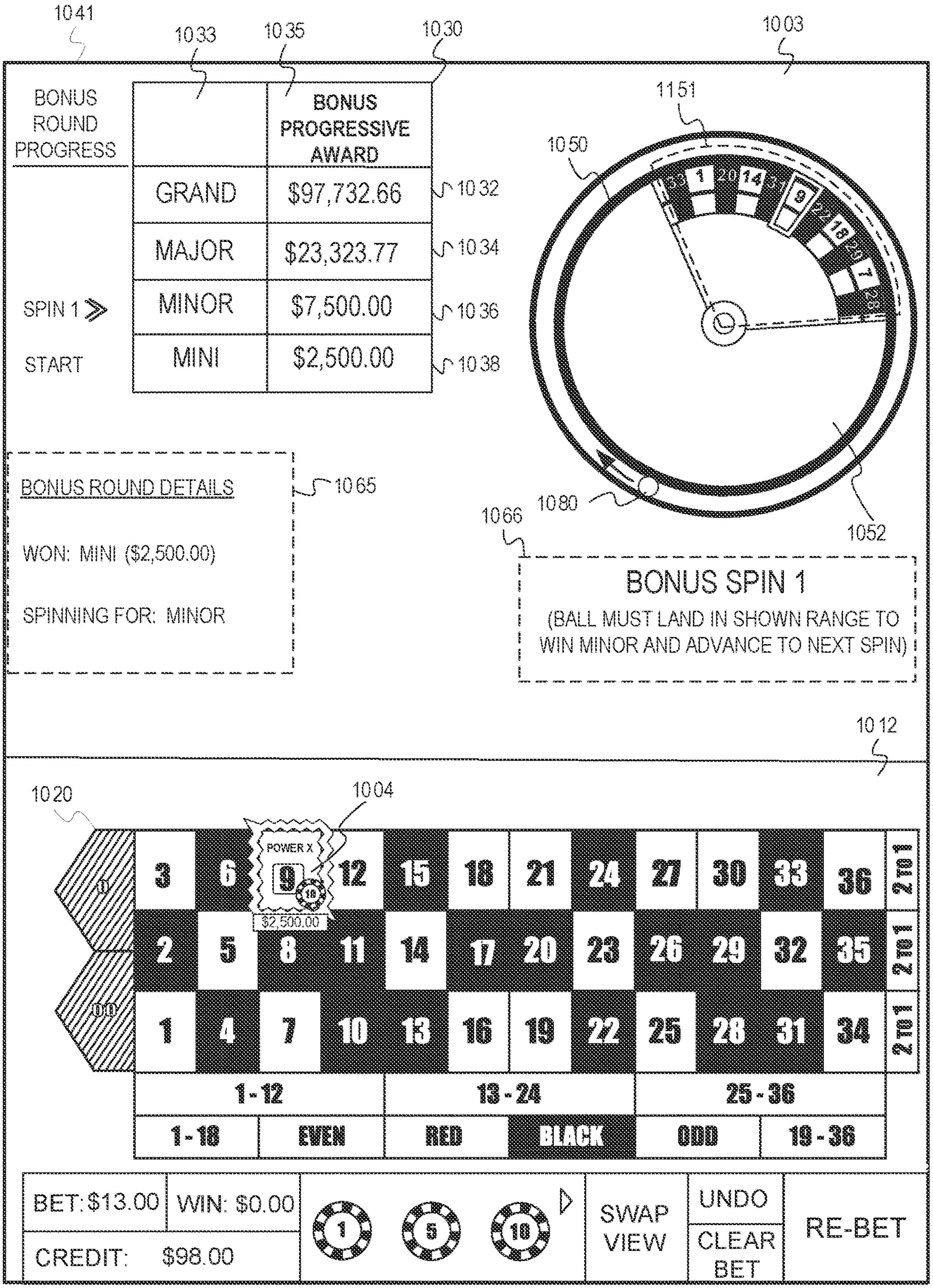

Referring momentarily back to FIG. 9, the flow 900 continues at processing block 915 where the active player terminal animates a range highlight effect of eligible pockets where a size of a pocket range corresponds to a progressive jackpot level. The size of the range of eligible pockets (e.g., the number of eligible pockets) for each round varies based on the progressive level of the round. For example, the range of eligible pockets for the given round comprises a number of wheel pockets selected from the roulette wheel. The number of wheel pockets selected corresponds in an opposing proportion to (e.g., is inversely proportional to, is inversely commensurate with, is inversely correlated to, etc.) a progressive jackpot level for the given round, such as for a multiplier level associated with a reset value for the corresponding progressive jackpot level. For example, as the rounds of the bonus game advance, the number of eligible pockets for winning each round decreases based on some proportion related to the progressive jackpot level. The reduction in the number of eligible pockets reduces the chances of winning the given round as there are fewer eligible pockets into which the roulette ball 1080 can land to win the round of the bonus game. Thus the chances of winning reduces for each round as the size of the range decreases. FIG. 11 illustrates a "Bonus Spin 1" of the bonus game, which corresponds to a spin to potentially win the "MINOR" progressive level. The active terminal presents, on the display 1003, an image of the wheel 1050, as well as the range highlight effect 1151 which indicates a first range of eligible winning pockets, namely the pockets associated with values "33," "1," "20," "14," "31," "9," "22," "18," "29," "7," or "28."

In some embodiments, the range of eligible pockets is centered around a pocket that corresponds to the randomly selected wheel-segment value for the bonus game. For example, the eligible winning pockets range in equal distances from the centrally situated pocket associated with the randomly selected wheel-segment value (e.g., also referred to herein as the "Power X Pocket" or the "Power X Value"). For example, for the "Bonus spin 1" the first range of eligible winning pockets extends from five pockets to the left of the central ("Power X") pocket to five pockets to the right (11 total eligible pockets). The range of eligible winning pockets may also be referred to herein as the "Power X Zone." If the ball lands in any one of the pockets in the Power X Zone (i.e., in any of the eligible pockets in the range of eligible pockets), then the player terminal wins the associated award for the round (e.g., the "MINOR"). Furthermore, the player terminal animates the mask 1052 to indicate (e.g., to de-emphasize) the non-eligible pockets (i.e., the pockets that are not within the range of eligible pockets). For instance, the mask 1052 de-emphasizes the portion(s) of the wheel that include the non-eligible pockets. In the embodiments shown in FIG. 9 through FIG. 16, the sections (e.g., segments) of the wheel within the range of eligible pockets are contiguous and/or adjacent to each other (e.g., wheel segments that adjoin each other or that share a common border). Other embodiments, however, can have different physical configurations for the locations of the eligible pockets from the range. For example, some of the eligible pockets may be on non-contiguous or non-adjoining segments of the wheel. Consequently, some portions of the mask 1052 may be non-contiguous or non-adjoining so as to accommodate to positions of non-contiguous or non-adjoining eligible pockets.

Referring momentarily back to FIG. 9, the flow 900 continues at processing block 917 where the game controller spins the wheel and the active player terminal animates the wheel spin. For example, as shown in FIG. 11, the "MINOR" round (e.g., "Bonus Spin 1") occurs while the range highlight effect 1151 and the mask 1052 are concurrently presented on the wheel 1050.

Figure 12:
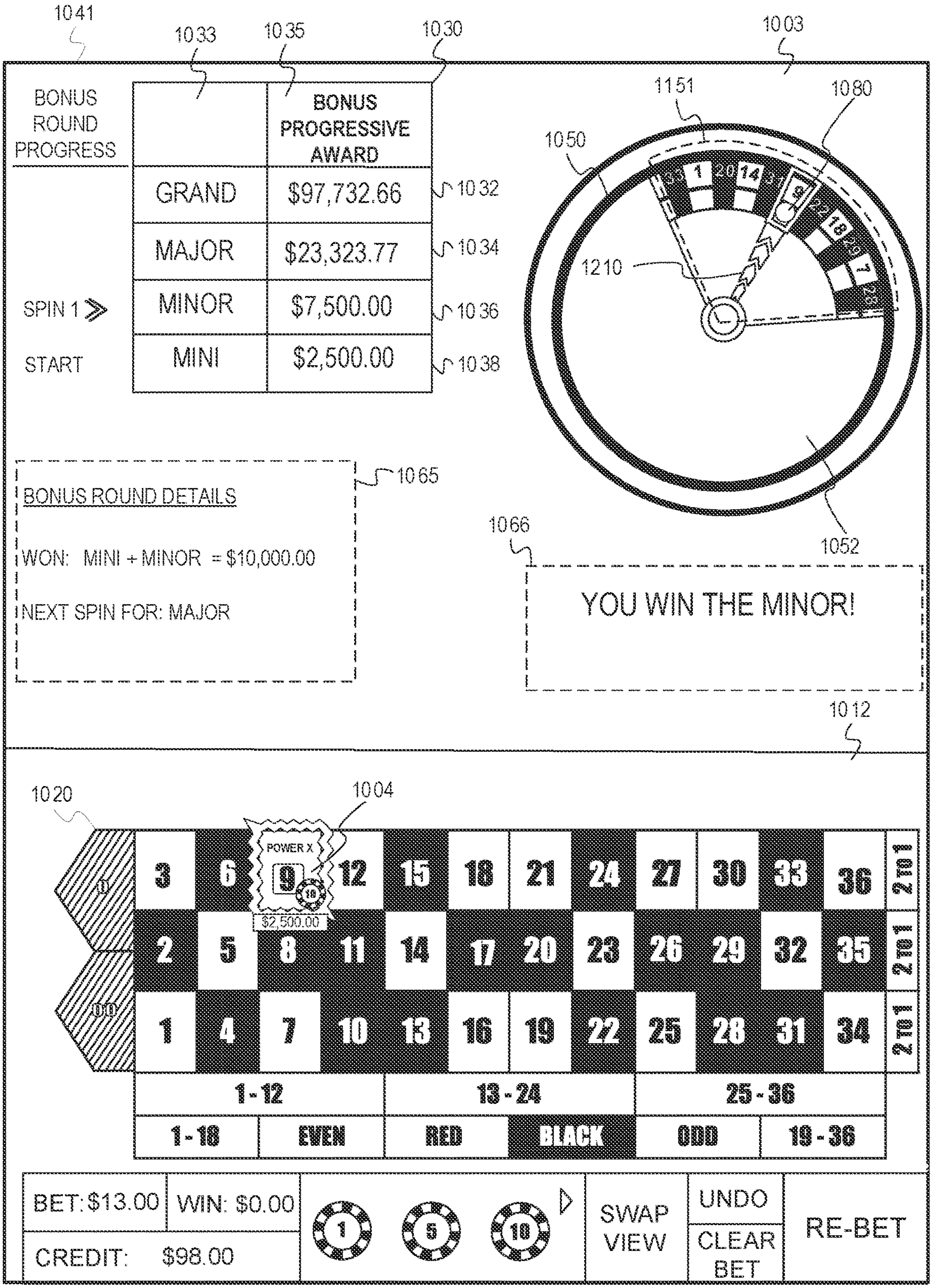

Referring momentarily back to FIG. 9, the flow 900 continues at processing block 919 where the active player terminal determines whether the spin result lands in the eligible range of pockets. For example, as shown in FIG. 12, as a result of the spin for the "MINOR" round, the ball 1080 lands in the pocket for the value "9." A winning highlight 1210 is presented to indicate that the ball landed within the eligible range. If the ball 1080 instead had landed in a non-eligible pocket (i.e., in a pocket that is outside the eligible range of pockets), then the bonus game ends. Furthermore, in one embodiment, if the ball lands in a pocket that corresponds to the originally selected wheel-segment value (i.e., if the ball lands in the Power X Pocket), then the bonus game may provide an additional award or enhancement feature. For example, if the ball lands in the Power X Pocket again, then the bonus game can pay an additional prize. In another example, if the ball lands in the Power X Pocket, an enhancement can be passed on to a successive round of the bonus game. For example, the enhancement can be passed on to the successive round so that the range of eligible pockets in the successive round is greater than would be provided by default. For example, the subsequent spin of the bonus game ("Spin 2" for the "MAJOR" shown in FIG. 13) includes a range of seven eligible pockets within Power X Zone. However, in one embodiment, because the ball 1080 lands in the Power X Pocket (i.e., in the pocket with the randomly selected Power X value of "9"), then an enhancement can be passed on to the "Spin 2" round (in FIG. 13) so instead of the Power X Zone having only a default of seven eligible pockets, the Power X Zone could increase the default number of eligible pockets for the round (e.g., increase from the default of seven eligible pockets for that round to instead include eleven eligible pockets).

Referring momentarily back to FIG. 9, the flow 900 continues at processing block 921 where the active player terminal animates a result highlight effect, awards the progressive jackpot level, and advances the bonus game to a successive round. For example, after the ball 1080 lands within the eligible pocket range (as shown in FIG. 12), the "MINOR" progressive level award is awarded to the player terminal and the bonus game advances to a successive round.

Figure 13:
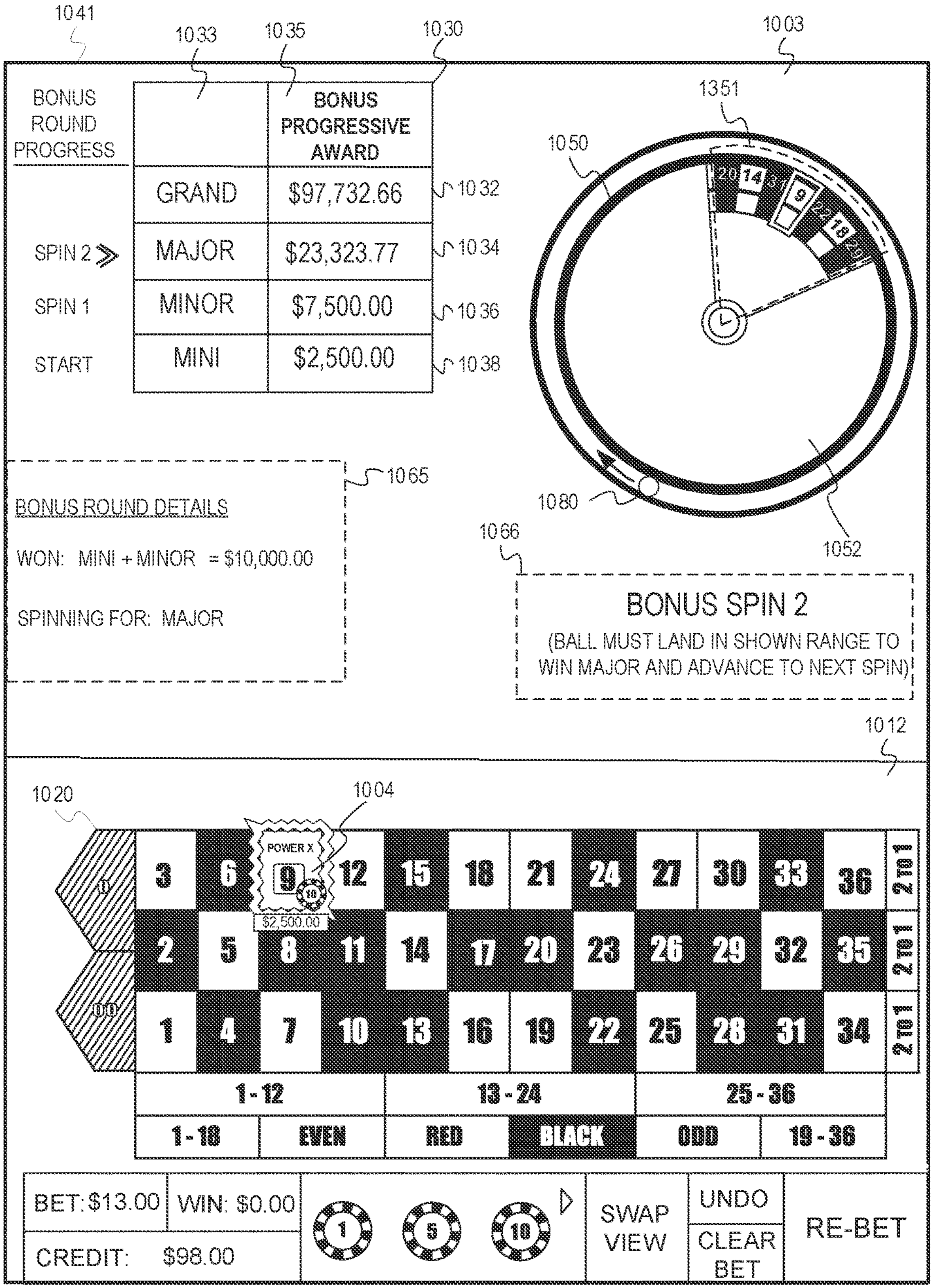
Figure 14:
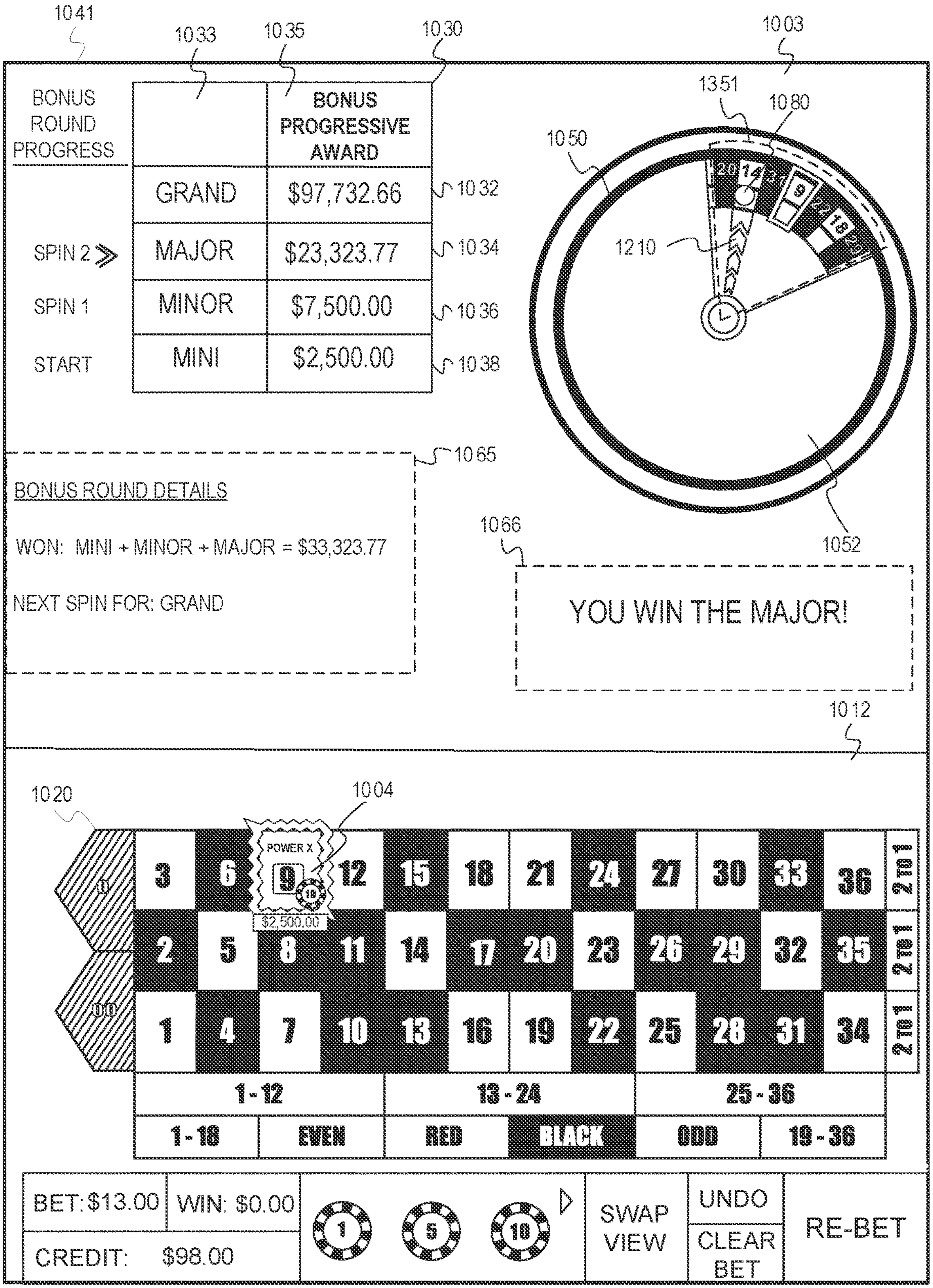

FIG. 13 and FIG. 14 illustrate an example of a successive round of the bonus game for a next progressive level listed in the table 1030 (i.e., the "MAJOR"). FIG. 13 shows an updated eligible pocket range via range highlight effect 1351. The range highlight effect 1351 indicates fewer possibilities for winning than the previous range shown in the range highlight effect 1151. The active terminal presents, on the display 1003 the range highlight effect 1351 which indicates the updated range of eligible winning pockets, namely the pockets associated with values "20," "14," "31," "9," "22," "18," or "29." For example, for the "Bonus spin 2" (i.e., the spin to win the "MAJOR"), the range of eligible winning pockets extends from three pockets to the left of the central (PowerX) pocket to three pockets to the right (7 total eligible pockets). The player terminal concurrently animates the mask 1052 to indicate the range of non-eligible pockets. If the ball lands in any one of the eligible pockets, then the player terminal wins the associated award (i.e., the "MAJOR") and the bonus game advances to a successive round. If the ball lands in any of the non-eligible pockets, then the bonus game ends. As shown in FIG., 14, the ball 1080 lands in the pocket associated with the value "14," which is within the range of eligible winning pockets. Hence, the winning highlight 1210 is presented to indicate that the ball landed within the eligible range, the progressive level for the "MAJOR" is awarded, and the bonus game advances to a final round.

Figure 15:
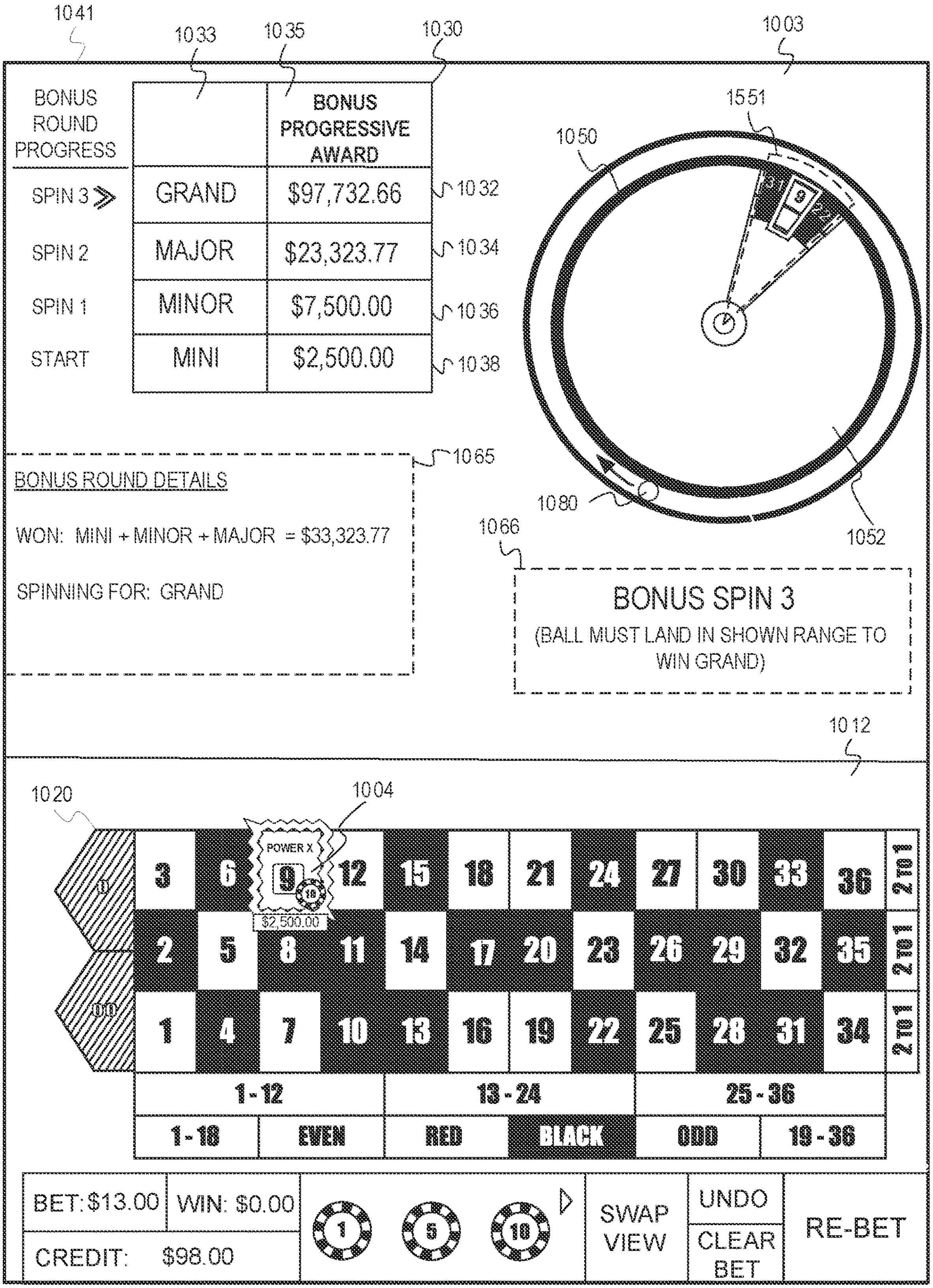
Figure 16:
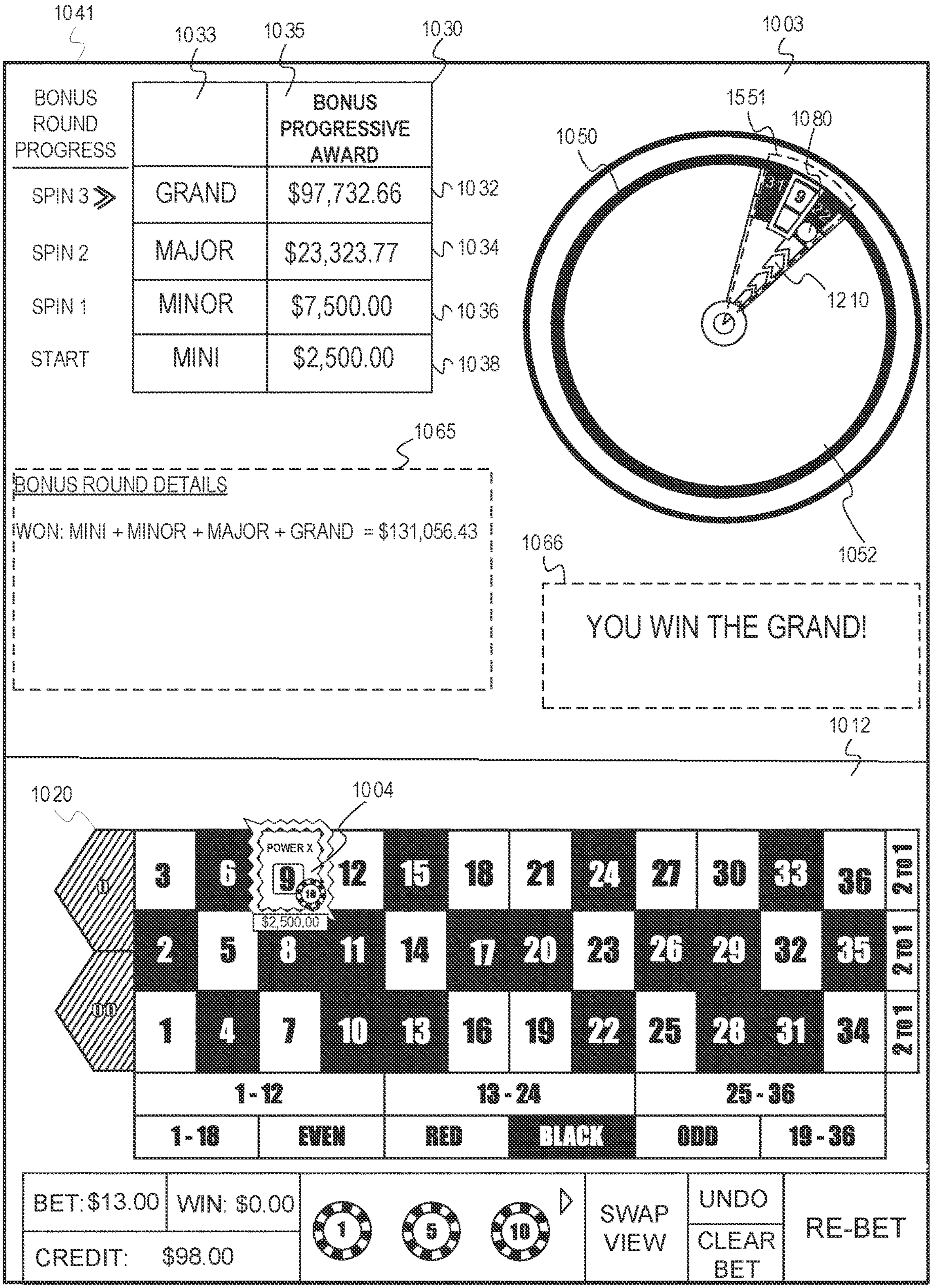

FIG. 15 and FIG. 16 illustrate an example of a final round of the bonus game for a next progressive level listed in the table 1030 (i.e., the "GRAND"). FIG. 15 shows an updated eligible pocket range via a range highlight effect 1551. The range highlight effect 1551 indicates fewer possibilities for winning than the previous range shown in the range highlight effect 1351 for the previous round. The active terminal presents, on the display 1003 the range highlight effect 1551 which indicates the range of eligible winning pockets for the round, namely the pockets associated with values "31," "9," or "22," For example, for the "Bonus spin 3" (i.e., the spin to win the "GRAND"), the range of eligible winning pockets extends from one pocket to the left of the central (PowerX) pocket to one pocket to the right (3 total eligible pockets). The player terminal concurrently animates the mask 1052 to indicate the range of non-eligible pockets. If the ball lands in any one of the eligible pockets, then the player terminal wins the associated award (i.e., the "GRAND"). If the ball lands in any of the non-eligible pockets, then the bonus game ends. As shown in FIG. 16, the ball 1080 lands in the pocket associated with the value "22," which is within the range of eligible winning pockets. Hence, the winning highlight 1210 is presented to indicate that the ball landed within the eligible range, the progressive level for the "GRAND" is awarded. As there are no more progressive levels in the table 1030 to advance to in a successive round of the bonus game, thus the bonus game ends.

FIG. 3 and FIG. 9, described by way of examples above, represent one or more algorithms that correspond to at least some instructions stored and executed by the game-logic circuitry associated with any of the systems or devices described for FIG. 1, FIG. 2, FIG. 4, FIG. 5, FIG. 6, FIG. 7, FIG. 8, FIG. 10, FIG. 11, FIG. 12, FIG. 13, FIG. 14, FIG. 15, or FIG. 16 to perform the above described functions associated with the disclosed concepts.

Any component of any embodiment described herein may include hardware, software, or any combination thereof.

Further, the operations described herein can be performed in any sensible order. Any operations not required for proper operation can be optional. Further, all methods described herein can also be stored as instructions on a computer readable storage medium, which instructions are operable by a computer processor. All variations and features described herein can be combined with any other features described herein without limitation. All features in all documents incorporated by reference herein can be combined with any feature(s) described herein, and also with all other features in all other documents incorporated by reference, without limitation.

Features of various embodiments of the inventive subject matter described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments which are defined only by the appended claims. Further, since numerous modifications and changes may readily occur to those skilled in the art, it is not desired to limit the inventive subject matter to the exact construction and operation illustrated and described, and accordingly all suitable modifications and equivalents may be resorted to, falling within the scope of the inventive subject matter.

What is claimed is:

1. A method comprising:

triggering, by an electronic processor associated with an electronic roulette game system, a progressive jackpot bonus game in response to a determination that a player terminal of the electronic roulette game system placed a bet on a randomly selected wheel-segment value from a roulette wheel of a roulette game, said bonus game comprising a plurality of rounds, wherein, for each round of the plurality of rounds:

determining, by the processor, an eligible progressive jackpot award amount for a respective one of a plurality of progressive jackpot levels by computing a ratio of an actual bet level of the bet to a maximum bet level required to be eligible to win a full award amount for the respective one of the plurality of progressive jackpot levels, and multiplying the full award amount by the ratio to obtain the eligible progressive jackpot award amount;

animating, by the processor via an electronic display associated with the player terminal, a betting-layout highlight effect that highlights a betting layout value corresponding to the bet and includes a meter that presents the eligible progressive jackpot award amount;

animating, by the processor via the electronic display associated with the player terminal, a first highlight effect that indicates a range of eligible pockets on the roulette wheel associated with the randomly selected wheel-segment value, wherein a size of the range of eligible pockets for each round corresponds to the respective one of the plurality of progressive jackpot levels associated with each round;

animating, by the processor via the electronic display concurrently with the first highlight effect, a mask highlight effect that de-emphasizes one or more non-eligible pockets on the roulette wheel outside the range of eligible pockets by dimming or reducing one or more display characteristics of the one or more non-eligible pockets; animating, by the processor after animating the first highlight effect, a spin of the roulette wheel; and animating, by the processor in response to determining a result of the spin, a second highlight effect to indicate whether the result of the spin lands within the range of eligible pockets.

2. The method of claim 1 further comprising: selecting, by the processor via use of a random number generator, the randomly selected wheel-segment value; and determining, by the processor in response to selecting the randomly selected wheel-segment value, that the player terminal for the roulette game placed, during a betting round of the roulette game, the bet on a betting layout value that corresponds to the randomly selected wheel-segment value.

3. The method of claim 2, wherein the determination that the player terminal placed the bet comprises determining, by the processor, that the player terminal placed a single-value bet type on the betting layout value.

4. The method of claim 2, wherein the randomly selected wheel-segment value corresponds to a single pocket from the roulette wheel, and said method further comprising animating, by the processor, a third highlight effect that highlights the betting layout value on a betting layout presented via the electronic display.

5. The method of claim 4, further comprising determining, by the processor, that the player terminal did not place a multi-value bet type on the betting layout value.

6. The method of claim 1, wherein the player terminal is one of a plurality of player terminals linked to the progressive jackpot bonus game, and said method further comprising presenting, by the processor, an indication of the bonus game via one or more communal displays associated with the plurality of player terminals.

7. The method of claim 1, wherein the range of eligible pockets for the given round comprises a number of wheel pockets selected from the roulette wheel, wherein the number of wheel pockets selected corresponds in an opposing proportion to the one of the plurality of progressive jackpot levels associated with each round.

8. The method of claim 7, wherein the respective one of the plurality of progressive jackpot levels associated with each round corresponds respectively to one of a plurality of reset values associated with each progressive jackpot level, wherein each one of the plurality of reset values corresponds respectively to one of a plurality of multiplier values.

9. The method of claim 1, wherein the first highlight effect comprises an indication of the range of eligible pockets centered around a specific pocket of the roulette wheel that corresponds to the randomly selected wheel-segment value.

10. The method of claim 9 further comprising: determining, by the processor prior to animating the second highlight effect, that the result of the spin lands within the specific pocket as opposed to landing within one of other pockets within the range of eligible pockets; and providing, in response to determining that the result of the spin lands within the specific pocket, an enhancement to a successive round of the bonus game, wherein the enhancement increases a default number of pockets within the range of eligible pockets for the successive round.

11. The method of claim 1, further comprising: awarding, by the processor, the one of the plurality of progressive jackpot levels to the player terminal in response to determination that the result of the spin lands within the range of eligible pockets; and in response to awarding the one of the plurality of progressive jackpot levels, advancing, by the processor, the bonus game from one round to a successive round of the bonus game, wherein the range of eligible pockets for the successive round decreases based on an increase in award value for an additional one of the plurality of progressive jackpot levels that corresponds to the successive round.

12. The method of claim 11, wherein the one of the plurality of progressive jackpot levels and the additional one of the plurality of progressive jackpot levels are listed within a table for the bonus game, wherein the table specifies a graphical correlation between the one of the plurality of progressive jackpot levels and the one round of the bonus game, and wherein the table specifies a graphical correlation between the additional one of the plurality of progressive jackpot levels and the successive round of the bonus game.

13. An electronic roulette game system comprising:

at least one player terminal;

an electronic display associated with the at least one player terminal; and one or more electronic processors configured to execute instructions, which when executed cause the electronic roulette game system to perform operations to:

accept, during a betting period of a roulette game, one or more bets from the at least one player terminal, wherein the one or more bets are placed on one or more user-selected betting layout values of a betting layout presented via the electronic display;

randomly select, via a random number generator after the betting period ends, a wheel-segment value associated with a roulette wheel for the electronic roulette game system;

determine that at least one of the one or more user-selected betting layout values corresponds to the randomly selected wheel-segment value;

trigger, in response to determination that the at least one of the one or more user-selected betting layout values corresponds to the randomly selected wheel-segment value, a progressive jackpot bonus game for the at least one player terminal;

determine, for at least one of the one or more bets, an eligible progressive jackpot award amount by computing a ratio of an actual bet level of the at least one of the one or more bets to a maximum bet level required to be eligible to win a full award amount, and multiplying the full award amount by the ratio to obtain the eligible progressive jackpot award amount;

animate, via the electronic display, a betting-layout highlight effect that highlights the at least one of the one or more user-selected betting layout values and includes a meter that presents the eligible progressive jackpot award amount;

animate, via the electronic display during an initial round of the bonus game, a first highlight effect that indicates a first range of eligible pockets on the roulette wheel associated with the randomly selected wheel-segment value;

animate, via the electronic display during the initial round of the bonus game concurrently with the first highlight effect, a mask highlight effect that de-emphasizes one or more non-eligible pockets on the roulette wheel outside the first range of eligible pockets by dimming or reducing one or more display characteristics of the one or more non-eligible pockets;

animate, during the bonus game after animation of the first highlight effect, a spin of the roulette wheel;

determine that a result of the spin lands within the first range of eligible pockets;

initiate, based on the result of the spin landing within the first range of eligible pockets, a subsequent round of the bonus game; and animate, via the electronic display during the subsequent round, a second highlight effect that indicates a second range of eligible pockets on the roulette wheel associated with the randomly selected wheel-segment value, wherein a size of the second range of eligible pockets is smaller than a size of the first range of eligible pockets.

14. The electronic roulette game system of claim 13, wherein the size of the first range of eligible pockets for the initial round corresponds to a first one of a plurality of progressive jackpot levels, and wherein the size of the second range of eligible pockets for the subsequent round corresponds to a second one of the plurality of progressive jackpot levels different from the first one of the plurality of progressive jackpot levels.

15. The electronic roulette game system of claim 14, wherein the first one of the plurality of progressive jackpot levels corresponds to a first reset value associated with a first multiplier value, and wherein the second one of the plurality of progressive jackpot levels corresponds to a second reset value associated with a second multiplier value.

16. The electronic roulette game system of claim 15, wherein the one or more electronic processors are further configured to execute instructions to cause the electronic roulette game system to perform operations to present a paytable associated with the bonus game, wherein the paytable correlates the first one of the plurality of progressive jackpot levels with the first multiplier value; and wherein the paytable correlates the second one of the plurality of progressive jackpot levels with the second multiplier value.

17. The electronic roulette game system of claim 13, wherein the determination that at least one of the one or more user-selected betting layout values corresponds to the randomly selected wheel-segment value comprises determination that the at least one of the one or more user-selected betting layout values is a single-value bet type.

18. The electronic roulette game system of claim 13, wherein the at least one player terminal is one of a plurality of player terminals linked to the progressive jackpot bonus game, wherein the one or more electronic processors are configured to execute instructions, which when executed cause the electronic roulette game system to perform operations to present an indication of the bonus game via one or more communal displays associated with the plurality of player terminals.

19. The electronic roulette game system of claim 13, wherein the first highlight effect comprises an indication of the first range of eligible pockets centered around a specific pocket of the roulette wheel that corresponds to the randomly selected wheel-segment value, and wherein the one or more electronic processors are further configured to execute instructions to cause the electronic roulette game system to perform operations to determine that the result of the spin lands within the specific pocket as opposed to landing within one of other pockets within the first range of eligible pockets; and provide, in response to determination that the result of the spin lands within the specific pocket, an enhancement to the subsequent round of the bonus game, wherein the enhancement increases a default number of pockets within the second range of eligible pockets.

20. The method of claim 1, wherein animating the mask highlight effect comprises applying a mask that is selectable between (i) an opaque mask that prevents presentation of the non-eligible pockets, and (ii) a semi-transparent mask that de-emphasizes the non-eligible pockets by reducing at least one of a luminance, color, lighting, resolution, or text characteristic of an appearance of the non-eligible pockets.

* * * * *